US012179100B2

(12) United States Patent
Oshino

(10) Patent No.: US 12,179,100 B2
(45) Date of Patent: Dec. 31, 2024

(54) GAME PROGRAM, METHOD, INFORMATION PROCESSING DEVICE, AND SYSTEM

(71) Applicant: The Pokémon Company, Tokyo (JP)

(72) Inventor: Yosuke Oshino, Tokyo (JP)

(73) Assignee: THE POKÉMON COMPANY, Tokyo (JP)

( * ) Notice: Subject to any disclaimer, the term of this patent is extended or adjusted under 35 U.S.C. 154(b) by 168 days.

(21) Appl. No.: 17/954,359

(22) Filed: Sep. 28, 2022

(65) Prior Publication Data

US 2023/0020283 A1 Jan. 19, 2023

Related U.S. Application Data

(63) Continuation of application No. PCT/JP2021/018910, filed on May 19, 2021.

(30) Foreign Application Priority Data

May 29, 2020 (JP) ................................. 2020-094538

(51) Int. Cl.
*A63F 13/428* (2014.01)
*A63F 13/35* (2014.01)
(Continued)

(52) U.S. Cl.
CPC ............ *A63F 13/428* (2014.09); *A63F 13/35* (2014.09); *A63F 13/48* (2014.09); *A63F 13/49* (2014.09);
(Continued)

(58) Field of Classification Search
None
See application file for complete search history.

(56) References Cited

U.S. PATENT DOCUMENTS 7,976,388 B2 * 7/2011 Park ....................... A61C 17/00
463/36
8,972,882 B2 * 3/2015 Berry ................. A46B 15/0008
715/764
(Continued)

FOREIGN PATENT DOCUMENTS

JP 2017-532076 A 11/2017
JP 2021-186250 A 12/2021

OTHER PUBLICATIONS

International Search Report and Written Opinion mailed on Aug. 3, 2021, received for PCT Application PCT/JP2021/018910, filed on May 19, 2021, 8 pages including English Translation.
(Continued)

*Primary Examiner* — Seng H Lim
(74) *Attorney, Agent, or Firm* — XSENSUS LLP

(57) ABSTRACT

A tooth brushing game includes starting counting a time that defines one play of a toothbrush game in response to starting the toothbrush game; capturing an image of a user; setting an area around a mouth by detecting a face area of the user from the captured image and detecting a facial part from the detected face area; detecting movement of an object including a toothbrush and a hand in the area around the mouth; controlling the toothbrush game based on the detected movement of the object; and stopping the counting of the time when the area around the mouth is not set but not stopping the counting when the movement of the object is not detected.

16 Claims, 18 Drawing Sheets

(51) Int. Cl.
*A63F 13/48* (2014.01)
*A63F 13/49* (2014.01)
*A63F 13/533* (2014.01)
*A63F 13/655* (2014.01)
*A63F 13/69* (2014.01)
*A63F 13/80* (2014.01)
*G06T 7/246* (2017.01)
*G06V 40/16* (2022.01)

(52) U.S. Cl.
CPC .......... *A63F 13/533* (2014.09); *A63F 13/655* (2014.09); *A63F 13/69* (2014.09); *A63F 13/80* (2014.09); *G06T 7/248* (2017.01); *G06V 40/165* (2022.01); *A63F 2300/308* (2013.01); *A63F 2300/609* (2013.01); *A63F 2300/636* (2013.01); *A63F 2300/695* (2013.01); *A63F 2300/8094* (2013.01); *G06T 2207/30201* (2013.01)

(56) References Cited

U.S. PATENT DOCUMENTS

| | | | | |
|---|---|---|---|---|
| 10,086,262 B1* | 10/2018 | Capper | ................ | G06F 1/1626 |
| 10,646,029 B2* | 5/2020 | Serval | ................ | A61B 5/0088 |
| 11,278,384 B2* | 3/2022 | Serval | ................ | G06N 20/00 |
| 2007/0270221 A1* | 11/2007 | Park | ................ | A61C 17/00 |
| | | | | 463/37 |
| 2008/0141476 A1* | 6/2008 | Gatzemeyer | ......... | A46B 15/004 |
| | | | | 463/31 |
| 2010/0100314 A1 | 4/2010 | Yeh | | |
| 2010/0170052 A1* | 7/2010 | Ortins | ................ | A63F 13/213 |
| | | | | 15/106 |
| 2011/0247156 A1* | 10/2011 | Schmid | ................ | A63F 13/245 |
| | | | | 15/105 |
| 2011/0275424 A1* | 11/2011 | Schmid | ................ | A46B 15/0002 |
| | | | | 15/22.1 |
| 2013/0125326 A1* | 5/2013 | Schmid | ................ | A61C 17/221 |
| | | | | 15/105 |
| 2016/0027327 A1* | 1/2016 | Jacobson | ........... | G09B 19/0084 |
| | | | | 434/263 |
| 2017/0069083 A1* | 3/2017 | Vetter | ................ | A61B 5/1128 |
| 2017/0238692 A1 | 8/2017 | Sarubbo et al. | | |
| 2018/0098620 A1 | 4/2018 | Lee et al. | | |
| 2019/0200746 A1* | 7/2019 | Serval | ................ | A61B 5/0077 |
| 2020/0359777 A1* | 11/2020 | Pesach | ................ | G06V 40/165 |
| 2021/0393026 A1* | 12/2021 | Subhash | ................ | G06T 7/248 |
| 2023/0017611 A1* | 1/2023 | Choi | ................ | G16H 30/20 |

OTHER PUBLICATIONS

Notice of Reasons for Refusal mailed on Mar. 15, 2022, received for JP Application 2022-011436, 10 pages including English Translation.

"Brushing Hero—LITALICO Apps", Available Online At: https://app.litalico.com/brushinghero/index.html, Retrieved from net on Sep. 13, 2022, pp. 1-5.

English translation of Written Opinion mailed Aug. 3, 2021, issued in International Application No. PCT/JP2021/018910.

* cited by examiner

FIG. 4

180 STORAGE UNIT

181 USER INFORMATION

| USER ID | USER NAME | AGE | LANGUAGE | DATE OF BIRTH | PLAY TIME | NOTIFICATION | NOTIFICATION TIME | REPLACEMENT DATE | HELD ITEMS | CAUGHT CHARACTERS |
|---|---|---|---|---|---|---|---|---|---|---|
| #1A2B3C | AZX123 | 5 | JP | 20YY/MM/DD | 1:00 | O | 20:00 | 20YY/MM/DD | ITEM A<br>ITEM B<br>ITEM C<br>... | CHARA. A<br>CHARA. B<br>CHARA. C<br>... |

182 COMMENT INFORMATION

| EVALUATION | COMMENT |
|---|---|
| A | ... |
| B | ... |
| C | ... |
|  | ... |
|  | ... |
| ... | ... |

FIG. 5

STORAGE UNIT (202)

USER INFORMATION DB (281)

| USER ID | USER NAME | AGE | LANGUAGE | DATE OF BIRTH | PLAY TIME | NOTIFICATION | NOTIFICATION TIME | REPLACEMENT DATE | HELD ITEMS | CAUGHT CHARACTERS |
|---|---|---|---|---|---|---|---|---|---|---|
| #1A2B3C | AZX123 | 5 | JP | 20YY/MM/DD | 1:00 | ○ | 20:00 | 20YY/MM/DD | ITEM A ITEM B ITEM C ... | CHARA. A CHARA. B CHARA. C ... |
| #6D7E8F | KKLLMM | 3 | JP | 20YY/MM/DD | 2:00 | ○ | 19:00 | 20YY/MM/DD | ITEM B ... | CHARA. B ... |
| #7H8I9J | OOPPQQ | 3 | EN | 20YY/MM/DD | 2:00 | × | - | 20YY/MM/DD | ITEM B ... | CHARA. B ... |
| ... | ... | | | | | | | | ... | |

LOG INFORMATION DB (282)

| USER ID | EXECUTION DATE | START TIME | EVALUATION |
|---|---|---|---|
| #6D7E8F | 20YY/MM/DD | 19:03 | A |
| #1A2B3C | 20YY/MM/DD | 20:01 | B |
| #7H8I9J | 20YY/MM/DD | 20:10 | A |
| | 20YY/MM/DD | 20:15 | A |
| | 20YY/MM/DD | 20:50 | B |
| ... | ... | | |

GAME PROGRAM, METHOD, INFORMATION PROCESSING DEVICE, AND SYSTEM

CROSS-REFERENCE TO RELATED APPLICATIONS

This is a Bypass Continuation of International Application No. PCT/JP2021/018910, filed May 19, 2021, which claims priority to JP 2020-094538, filed May 29, 2020, the entire contents of each are incorporated herein by its reference.

BACKGROUND

Field

The present disclosure relates to a game program, a method, an information processing device, and a system.

Description of Related Art

For children who dislike brushing their teeth, an application for promoting tooth brushing is provided (NPL 1). According to NPL 1, a user executes an application installed on a mobile terminal to start a game. In that game, an image of the user brushing his/her teeth is captured by the camera of the mobile terminal. The captured image and a game screen are displayed on the display of the mobile terminal. The user brushes his/her teeth by moving a toothbrush while checking his/her image displayed on the display.

CITATION LIST

Non Patent Literature

[NPL 1] LITALICO, "Brushing Hero", [online], [Retrieved on May 1, 2020], Internet <URL: https://app.litalico.com/brushinghero/jp.html>

SUMMARY

In the application according to NPL 1, a time limit for one-time tooth brushing is set, and evaluation is made according to the movement of the toothbrush within the time limit. Therefore, the user would continue to move the toothbrush within the time limit to enhance the evaluation.

However, according to NPL 1, the counting of the time limit continues even while the user is not brushing his/her teeth. For this reason, even in the case where there is a temporary situation in which the tooth brushing cannot be continued, for example when the user who moves the toothbrush changes in the case where a child brushes his/her own teeth and then an adult brushes the child's teeth for finishing brushing, the game progresses, which may discourage you from brushing his/her tooth.

Therefore, an object of the present disclosure is to provide a game program, a method, and an information processing device that do not inhibit the user from brushing his/her teeth while maintaining the attractiveness.

According to a non-limiting embodiment, a game program for being executed by a computer including a processor and a memory is provided. The game program causes the processor to execute the steps of: starting counting a time that defines one play of a toothbrush game in response to starting the toothbrush game; capturing an image of a user; setting an area around a mouth by detecting a face area of the user from the captured image and detecting a facial part from the detected face area; detecting movement of an object including a toothbrush and a hand in the area around the mouth; controlling the toothbrush game based on the detected movement of the object; and stopping the counting of the time when the area around the mouth is not set but not stopping the counting when the movement of the object is not detected.

According to the present disclosure, it is possible not to inhibit the user from brushing his/her teeth while maintaining the attractiveness.

BRIEF DESCRIPTION OF DRAWINGS

FIG. 4 illustrates a data structure of user information and comment information, which are stored in the terminal device.

FIG. 5 illustrates a data structure of a user information database and a log information database, which are stored in the server.

DETAILED DESCRIPTION

Hereinafter, embodiments of the present disclosure will be described with reference to the drawings. In the following description, the same parts are denoted by the same reference signs. Names and functions thereof are the same. Therefore, detailed description of them will not be repeated.

<1 Configuration Diagram of Entire Game System>

Figure 1:
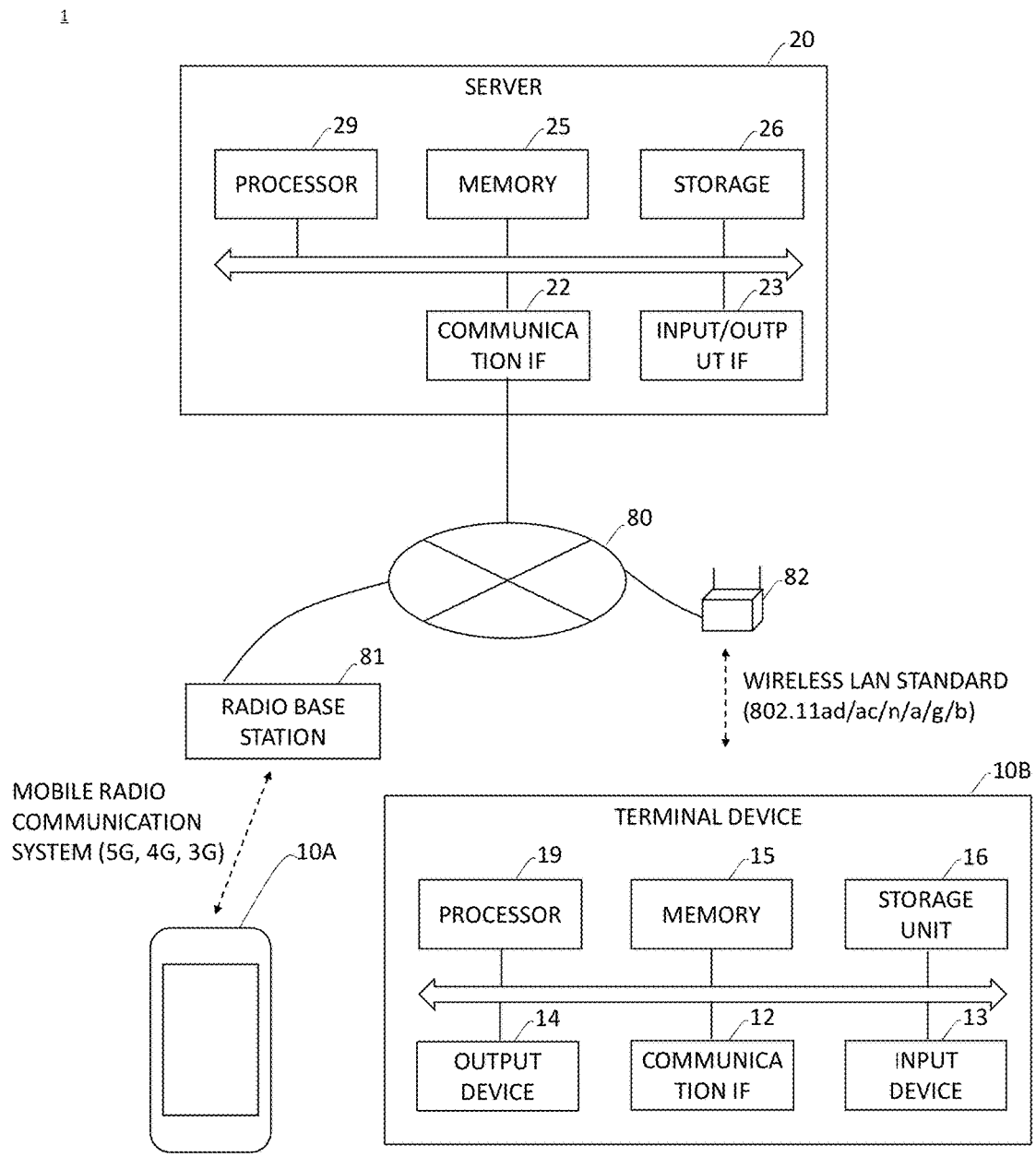
FIG. 1 is a diagram illustrating the entire configuration of a game system according to one or more aspects of the disclosed subject matter.

FIG. 1 is a diagram illustrating the entire configuration of a game system 1. In the game system 1, terminal devices (corresponding to a terminal device 10A and a terminal device 10B illustrated in FIG. 1; hereinafter, collectively referred to as "terminal device(s) 10") provide the user with a toothbrush game, and a server 20 manages information on users on the toothbrush game.

As illustrated in FIG. 1, the game system 1 includes a plurality of terminal devices 10 and the server 20. The terminal device 10 and the server 20 are communicatively connected through a network 80.

In the present embodiment, each of the devices (the terminal device, the server, or the like) may be configured as an information processing device. Further, a collection of such devices may be configured as one information processing device. In other words, the game system 1 may be built as a collection of a plurality of devices. A method for distributing a plurality of functions required for realizing the game system 1 according to the present embodiment to one or a plurality of pieces of hardware can be appropriately determined in consideration of the processing capability of each piece of hardware and/or specifications required for the game system 1, and the like.

The terminal device 10 is a device operated by a user. The terminal device 10 is realized as a mobile terminal such as a smartphone or a tablet, which is compatible with a mobile communication system. Other than that, the terminal device 10, for example, may be a stationary-type personal computer (PC), a laptop PC, or a game console. In addition, the terminal device 10 may be configured to function as a head mounted display and, for example, may be configured to function as a head mounted display of a transmissive type, a non-transmissive type, or a see-through type. For example, the terminal device 10 may be configured to function as a portable terminal in the case of not functioning as a head mounted display and function as a head mounted display by being mounted in a goggle-type device. In such a case, the terminal device 10 can perform switching between a mode in which the terminal device functions as a portable terminal and a mode in which the terminal device functions as a head mounted display. In the case of the mode in which the terminal device functions as a head mounted display, the terminal device 10 detects a movement of a user's head part using a movement sensor built in the terminal device 10 and updates a displayed image of the display in accordance with a movement of the user's head part.

The terminal device 10 is connected to the network 80 by communicating with a communication device such as a radio base station 81 compliant with a communication standard such as 5G, Long Term Evolution (LTE), or the like, a wireless LAN router 82 compliant with a wireless local area network (LAN) standard such as Institute of Electrical and Electronics Engineers (IEEE) 802.11 or the like.

As represented as the terminal device 10B in FIG. 1, the terminal device 10 includes a communication interface (IF) 12, an input device 13, an output device 14, a memory 15, a storage unit 16, and a processor 19.

The communication IF 12 is an interface through which signals are input and output to enable the terminal device 10 to communicate with external devices.

The input device 13 is an input device (for example, a pointing device such as a touch panel, a touch pad, a mouse, or the like, a keyboard, and the like) for receiving an input operation from a user.

The output device 14 is an output device (a display, a speaker, or the like) used for presenting information to a user.

The memory 15 is for temporarily storing a program, data processed by a program or the like, and the like and, for example, is a volatile memory such as a dynamic random access memory (DRAM).

The storage unit 16 is a storage device for storing data and, for example, is a flash memory or a hard disc drive (HDD).

The processor 19 is hardware used for executing a command set described in a program and is configured using an arithmetic operation device, a register, a peripheral circuit, and the like.

The server 20 includes a communication IF 22, an input/output IF 23, a memory 25, a storage 26, and a processor 29.

The server 20 manages information on users who use the toothbrush game. The server 20 manages, as the user information, for example, information for identifying a user, a user's name, game characters caught by the user, game items held by the user, and various types of information set by the user. The server 20 may manage the amount of virtual currency held (including the one given to the user free of charge and the one given to the user for a fee).

In addition, the server 20 manages log information on the user playing the toothbrush game. The server 20 manages, as the log information, for example, user identification information, game execution date, game start time, information on evaluation of brushing teeth, and the like.

The communication IF 22 is an interface through which signals are input and output to enable the server 20 to communicate with external devices.

The input/output IF 23 functions as an interface between an input device for receiving an input operation from a user and an output device for presenting information to a user.

The memory 25 is used for temporarily storing programs, data processed by the programs, and the like and, for example, is a volatile memory such as a dynamic random access memory (DRAM).

The storage 26 is a storage device used for storing data and, for example, is a flash memory, a hard disc drive (HDD), or the like.

The processor 29 is hardware used for executing a command set described in a program and is configured of an arithmetic operation device, a register, a peripheral circuit, and the like.

<1.1 Configuration of Terminal Device 10>

Figure 2:
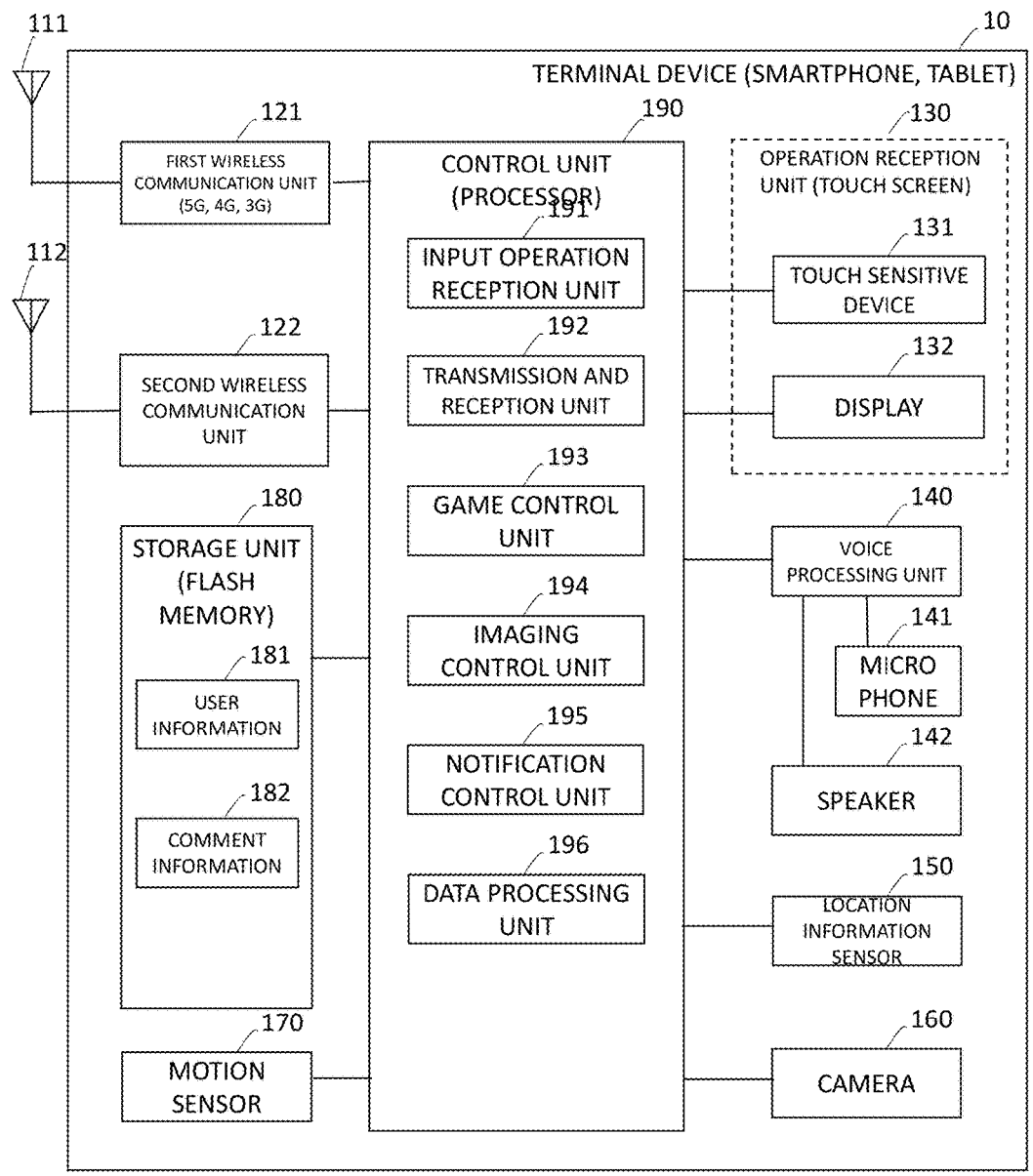
FIG. 2 is a block diagram of a terminal device which is a component of the game system according to one or more aspects of the disclosed subject matter.

FIG. 2 is a block diagram of the terminal device 10 which is a component of the game system 1 according to a first embodiment. As illustrated in FIG. 2, the terminal device 10 includes a plurality of antennas (an antenna 111 and an antenna 112), wireless communication units respectively corresponding to the antennas (a first wireless communication unit 121 and a second wireless communication unit 122), an operation reception unit 130 (including a touch sensitive device 131 and a display 132), a voice processing unit 140, a microphone 141, a speaker 142, a location information sensor 150, a camera 160, a motion sensor 170, a storage unit 180, and a control unit 190.

The terminal device 10 also has functions and configurations (for example, a battery for holding power, a power supply circuit for controlling the supply of power from the battery to each circuit, and the like) that are not particularly illustrated in FIG. 2. As illustrated in FIG. 2, respective blocks included in the terminal device 10 are electrically connected by a bus or the like.

The antenna 111 radiates a signal generated by the terminal device 10 as radio waves. Further, the antenna 111 receives radio waves from a space and provides a received signal to the first wireless communication unit 121.

The antenna 112 radiates a signal generated by the terminal device 10 as radio waves. Further, the antenna 112 receives radio waves from a space and provides a received signal to the second wireless communication unit 122.

The first wireless communication unit 121 performs modulation and demodulation processing for transmitting and receiving signals via the antenna 111 to enable the terminal device 10 to communicate with other wireless devices. The second wireless communication unit 122 performs modulation and demodulation processing for transmitting and receiving signals via the antenna 112 to enable the terminal device 10 to communicate with other wireless devices. The first wireless communication unit 121 and the second wireless communication unit 122 are communication modules including a tuner, a received signal strength indicator (RSSI) calculation circuit, a cyclic redundancy check (CRC) calculation circuit, a high frequency circuit, and the like. The first wireless communication unit 121 and the second wireless communication unit 122 perform modulation, demodulation, and frequency conversion on wireless signals transmitted and received by the terminal device 10, and provide the received signals to the control unit 190.

The operation reception unit 130 has a mechanism for receiving an input operation from the user. Specifically, the operation reception unit 130 is configured as a touch screen, and includes the touch sensitive device 131 and the display 132. The touch sensitive device 131 receives an input operation from the user of the terminal device 10. The touch sensitive device 131 uses the capacitive touch panel, for example, to detect a contact position of the user on a capacitive touch panel. The touch sensitive device 131 outputs a signal indicating the contact position of the user detected by the touch panel to the control unit 190 as an input operation.

The display 132 displays data such as an image, a moving image, and text under the control of the control unit 190. The display 132 is realized as, for example, a liquid crystal display (LCD) or an organic electro-luminescence (EL) display.

The voice processing unit 140 performs modulation and demodulation on a voice signal. The voice processing unit 140 modulates a signal provided from the microphone 141, and provides the resulting modulated signal to the control unit 190. Further, the voice processing unit 140 provides the voice signal to the speaker 142. The voice processing unit 140 is realized as, for example, a processor for voice processing. The microphone 141 receives a voice input and provides a voice signal corresponding to the voice input to the voice processing unit 140. The speaker 142 converts the voice signal provided from the voice processing unit 140 into a voice and outputs the voice to the outside of the terminal device 10.

The location information sensor 150 is a sensor that detects the location of the terminal device 10, and is, for example, a global positioning system (GPS) module. The GPS module is a reception device that is used in a satellite positioning system. The satellite positioning system receives signals from at least three or four satellites, and detects the current location of the terminal device 10 on which the GPS module is mounted, on the basis of the received signals. For example, in a case where the game system 1 is configured to be able to refer to locations of users who are registered as friends, the terminal device 10 can display a list of friends present near a user on the display 132.

The camera 160 is a device for receiving light using a light reception element and outputting the light as a captured image signal. The camera 160 is, for example, a depth camera capable of detecting a distance from the camera 160 to an object to be captured. For example, a lens of the camera 160 for receiving light and the display 132 are arranged side by side. This makes it possible for the camera 160 to capture an image of the user who visually recognizes the display 132.

The motion sensor 170 includes an acceleration sensor, an angular velocity sensor, and the like, detects a movement of the terminal device 10, and outputs a sensing result.

The storage unit 180 is configured of, for example, a flash memory. The storage unit 180 stores data and programs associated with the toothbrush game. The storage unit 180 stores data used in the toothbrush game, for example, the user information 181 and the comment information 182.

The user information 181 is information on each user in the toothbrush game based on a game program. The user information includes information for identifying a user, a user's name, game characters caught by the user, game items held by the user, various types of information set by the user, and the like.

The comment information 182 is information about comments displayed to the user while the toothbrush game is in progress. The comments include advice on tooth brushing or useful information about tooth brushing. In the comment information 182, for example, a comment is associated with an evaluation of brushing teeth to be done during the toothbrush game. The comment information 182 is downloaded from the server 20, for example, and stored in the storage unit 180.

The control unit 190 is realized by the processor 19 reading the program stored in the storage unit 180 and executing instructions included in the program. The control unit 190 controls the operation of the terminal device 10. The control unit 190 operates in accordance with a program, thereby exhibiting functions of an input operation reception unit 191, a transmission and reception unit 192, a game control unit 193, an imaging control unit 194, a notification control unit 195, and a data processing unit 196.

The input operation reception unit 191 performs processing of receiving an input operation from the user on an input device such as the touch sensitive device 131. The input operation reception unit 191 determines the type of the operation, such as whether the operation of the user is a flick operation, a tap operation, a drag (swipe) operation, or the like on the basis of information of coordinates at which the user touches the touch sensitive device 131 with a finger or the like.

The transmission and reception unit 192 performs processing for the terminal device 10 to transmit or receive data to or from an external device such as the server 20 according to a communication protocol.

The game control unit 193 performs processing of advancing the toothbrush game. For example, the game control unit 193 starts the toothbrush game based on data input from the user. Further, the game control unit 193 advances the toothbrush game based on the motion of a predetermined object detected by the data processing unit 196. Further, the game control unit 193 ends one play of the toothbrush game when the play time reaches a predetermined time.

The imaging control unit 194 performs processing of controlling the camera 160.

The notification control unit 195 performs processing of presenting information to the user. The notification control unit 195 performs processing of causing the display 132 to display a display image and a game image, processing of causing the speaker 142 to output a voice, and the like.

The data processing unit 196 performs processing of performing computation on data received by the terminal device 10 in accordance with a program and outputting a result of the computation to the memory 15 or the like. Specifically, the data processing unit 196 performs image analysis on a captured image, for example, and detects a predetermined area in the captured image. The data processing unit 196 detects a regular motion of a predetermined object in the detected area.

<1.2 Functional Configuration of Server 20>

Figure 3:
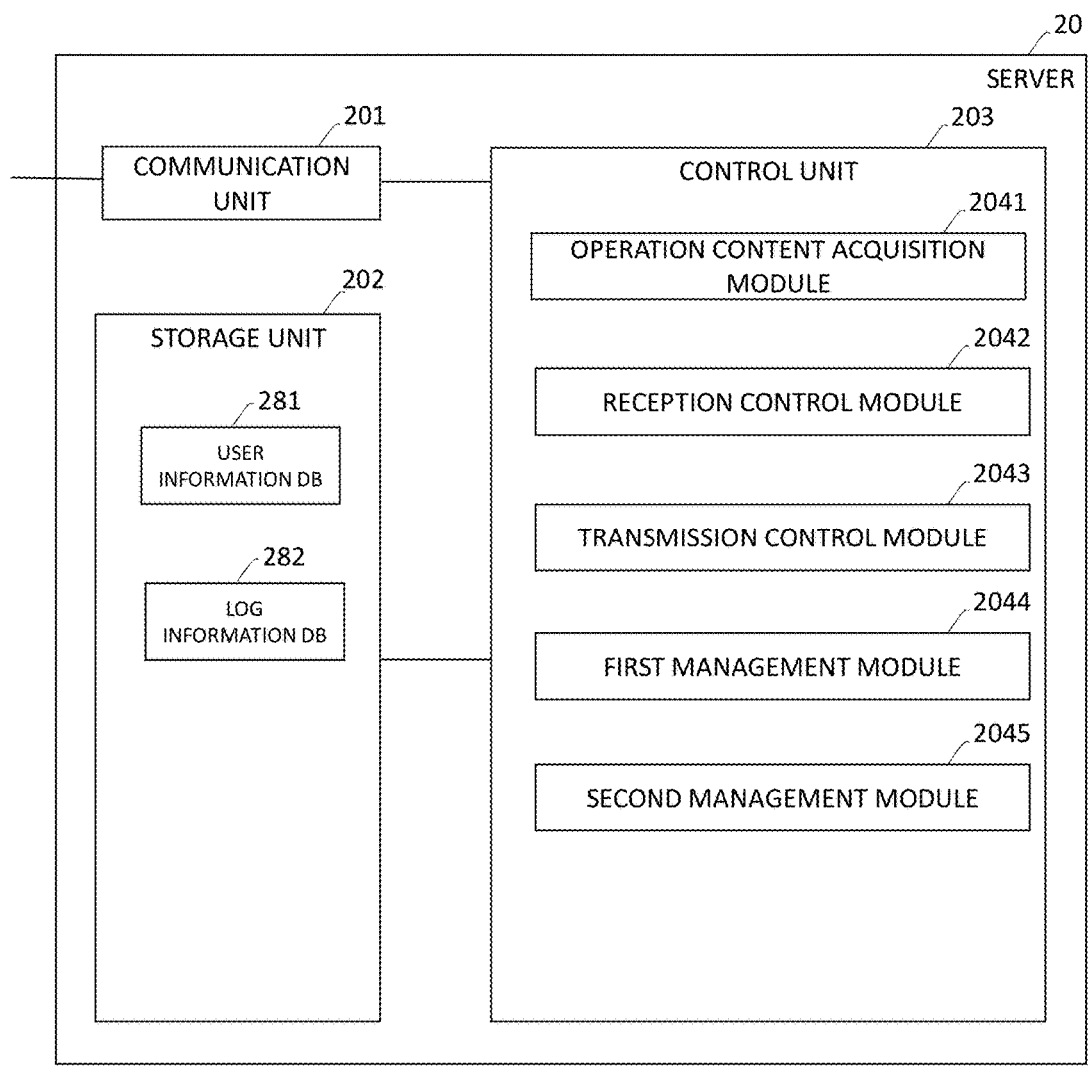
FIG. 3 is a diagram illustrating a functional configuration of a server.

FIG. 3 is a diagram illustrating a functional configuration of the server 20. As illustrated in FIG. 3, the server 20 exhibits functions of a communication unit 201, a storage unit 202, and a control unit 203.

The communication unit 201 performs processing for enabling the server 20 to communicate with external devices.

The storage unit 202 stores data and programs associated with the toothbrush game. The storage unit 202 includes a database in which data related to the toothbrush game is stored, for example, a user information database 281, and a log information database 282.

The user information database 281 is a database used for storing information on each user in the toothbrush game. Details will be described below.

The log information database 282 is a database used for storing a play log of the toothbrush game. Details will be described below.

The control unit 203 is realized by the processor 29 reading the program stored in the storage unit 202 and executing instructions included in the program. The control unit 203 operates in accordance with the program, thereby exhibiting functions of an operation content acquisition module 2041, a reception control module 2042, a transmission control module 2043, a first management module 2044, and a second management module 2045.

The operation content acquisition module 2041 acquires operation content of the user. The operation content acquisition module 2041, for example, acquires a game unit that has been designated by the user as a target for game play and the like as operation content of the user.

The reception control module 2042 controls processing for the server 20 to receive a signal from an external device in accordance with a communication protocol.

The transmission control module 2043 controls processing for the server 20 to transmit a signal to an external device in accordance with a communication protocol.

The first management module 2044 manages the user information database 281. For example, when the first management module 2044 receives information on the toothbrush game from the terminal device 10, the first management module 2044 updates the user information database 281 based on the received information.

The second management module 2045 manages the log information database 282. For example, when the second management module 2045 receives information on the toothbrush game from the terminal device 10, the second management module 2045 updates the log information database 282 based on the received information.

<2 Data Structure>

FIG. 4 illustrates a data structure of the user information 181 and the comment information 182, which are stored in the terminal device 10.

As illustrated in FIG. 4, each record in the user information 181 includes items, for example, "user ID", "user name", "age", "language", "date of birth", "play time", "notification", "notification time", "replacement date", "held items", and "caught characters".

The item "user ID" refers to information for identifying a user. The user ID is automatically set, for example, when an account is created.

The item "user name" refers to a name set by the user. The user name is set based on a user input, for example, when the account is created.

The item "age" refers to the age of the user. The age is set based on a user input, for example, when the account is created.

The item "language" is a language set by the user, which is used by the user. The language is set based on a user input, for example, when the account is created. For game screens displayed on the display 132, the language set in that item is used.

The item "date of birth" refers to the date of birth of the user. The date of birth is set based on a user input, for example, when the account is created.

The item "play time" refers to a time limit for playing the toothbrush game once. When the toothbrush game is started, the counting for the play time is started. When the play time is reached, one play of the toothbrush game ends. The play time can be set by a user operation at any time when the toothbrush game is not played. The play time may be directly input by the user, for example, or may be selected and input by the user as a convenient time such as 1 minute, 1 minute and 30 seconds, or 2 minutes.

The item "notification" refer to the necessity of notification for the start of the toothbrush game. The necessity of notification is represented by, for example, a "circle" indicating that it is necessary or a "cross" indicating that it is not necessary.

The item "notification time" refers to the time for notifying the start of the toothbrush game. For the item "notification" of a circle, when the time of that item is reached, the toothbrush game is automatically executed and a start screen is displayed on the display 132.

The item "replacement date" refers to the date when the toothbrush was most recently replaced. The server 20 may receive an operation indicating that the toothbrush has been replaced from the user of the terminal device 10, or may detect that the toothbrush has been replaced regardless of any user operation. The terminal device 10 identifies the toothbrush being used by the user in the toothbrush game, for example, by image analysis in the toothbrush game described later, and stores information for identifying the identified toothbrush (for example, calculation data in which a feature of a toothbrush portion in an image by the image analysis is calculated). The terminal device 10 detects that the toothbrush has been replaced by the image analysis. The server 20 writes the date when the toothbrush was replaced in that item in response to the detection in the terminal device 10.

The item "held items" refers to information on game items held by the user. A game item is given by the server 20 as a reward for playing the toothbrush game, for example. The game items include, for example, a game object displayed in association with a part of the user's body in a captured image of the user in the toothbrush game described later. For example, the game items include a headgear displayed in association with a part of the user's body (for example, the head) recognized in the captured image in the toothbrush game described later. The headgear is displayed and superimposed on the captured image of the user so that the headgear is worn on the head of the user displayed on the display 132 during the play of the toothbrush game. The headgear has a variety of headgear designs, any one of which is adopted, for example based on the face of a character used in the toothbrush game.

Further, the game items include a game object that is displayed as an image superimposed on a captured image of the user in the toothbrush game, a capture image which is another captured image in the toothbrush game, or the like. The game object includes an object designed with the motif of a character (including a character that can be caught by the user) appearing in the toothbrush game, for example, a sticker-shaped game object that can be superimposed on a still image. The sticker is designed with the motif of a character caught by the user. Although a sticker is exemplified herein, it may be referred to as a stamp or a mark as long as it can have a shape available associated with a caught character.

The game items also include a background image that is composited on the background of the user. The background image is based on a scenery associated with the characteristics of a character.

The item "caught characters" refers to information on game characters caught by the user. A game character is caught, for example, when the user brushes teeth well in the toothbrush game. Here, the context "the user brushes teeth well in the toothbrush game" includes that in the toothbrush game described later, an action determined to be that the user is moving the toothbrush is repeatedly detected within a certain period of time, the action is repeatedly detected a certain number of times, and the like. In addition, the context "the user brushes teeth well in the toothbrush game" includes that in the toothbrush game described later, when an action of the user moving the toothbrush is detected and then the game is advanced according to the detection result, a certain game parameter is achieved (for example, making a certain number of successful toothbrush movements, giving a certain amount of damage to a boss character, and the like). There are a variety of types of game characters, each of which has a different shape or color. This item also includes information on the type of the game character and the like.

As illustrated in FIG. 4, each of the records of the comment information 182 includes items "evaluation", "comment", and the like.

The item "evaluation" indicates a parameter that evaluates the result of the user brushing teeth in the toothbrush game. For example, it indicates a result that the server 20 evaluates the tooth brushing action of the user based on sensing data on which the user brushes teeth with a toothbrush in the toothbrush game or based on the result of advancing the game in response to the detection of the tooth brushing action. In the example illustrated in FIG. 4, an A/B/C evaluation is given to one play. Such an evaluation may be based on any index, for example, an evaluation of teeth left unbrushed, an evaluation of carefulness, an evaluation of the way of moving the toothbrush, and the like. For example, an evaluation may be given based on the number of times that the way of moving the toothbrush is determined to be excellent during one play of the toothbrush game. Further, the evaluation index is not limited to A/B/C, and any index may be used.

The item "comment" refers to a comment about tooth brushing. The comment described therein is a comment corresponding to the evaluation in the same record. The comment includes advice on tooth brushing, such as how to use a toothbrush well, how to brush unbrushed teeth well, and the like. The comment also includes useful information about tooth brushing, such as the effective brushing time of day, description of cause of tooth decay, and introduction to an effective toothbrush.

FIG. 5 illustrates a data structure of the user information database 281 and the log information database 282, which are stored in the server 20.

As illustrated in FIG. 5, in the user information database 281, the user information 181, which is stored in the plurality of terminal devices 10, is managed. As in the user information 181, each record in the user information database 281 includes items, for example, "user ID", "user name", "age", "language", "date of birth", "play time", "notification", "notification time", "replacement date", "held items", and "caught characters".

As illustrated in FIG. 5, each record in the log information database 282 includes items, for example, "user ID", "execution date", "start time", and "evaluation".

The item "execution date" refers to the date on which the toothbrush game was played.

The item "start time" refers to the time when the play of the toothbrush game was started.

The item "evaluation" indicates a parameter that evaluates the result of the user brushing teeth in the toothbrush game. For example, it indicates a result that the server 20 evaluates the tooth brushing action of the user based on sensing data on which the user brushes teeth with a toothbrush in the toothbrush game or based on the result of advancing the game in response to the detection of the tooth brushing action. For example, regardless of the result of the user advancing the toothbrush game, the result of the user brushing teeth may be evaluated based on the result of detecting the tooth brushing action (for example, how many times the toothbrush is moved, or whether the teeth are brushed evenly at some tooth brushing points).

<3 Operation>

Figure 6:
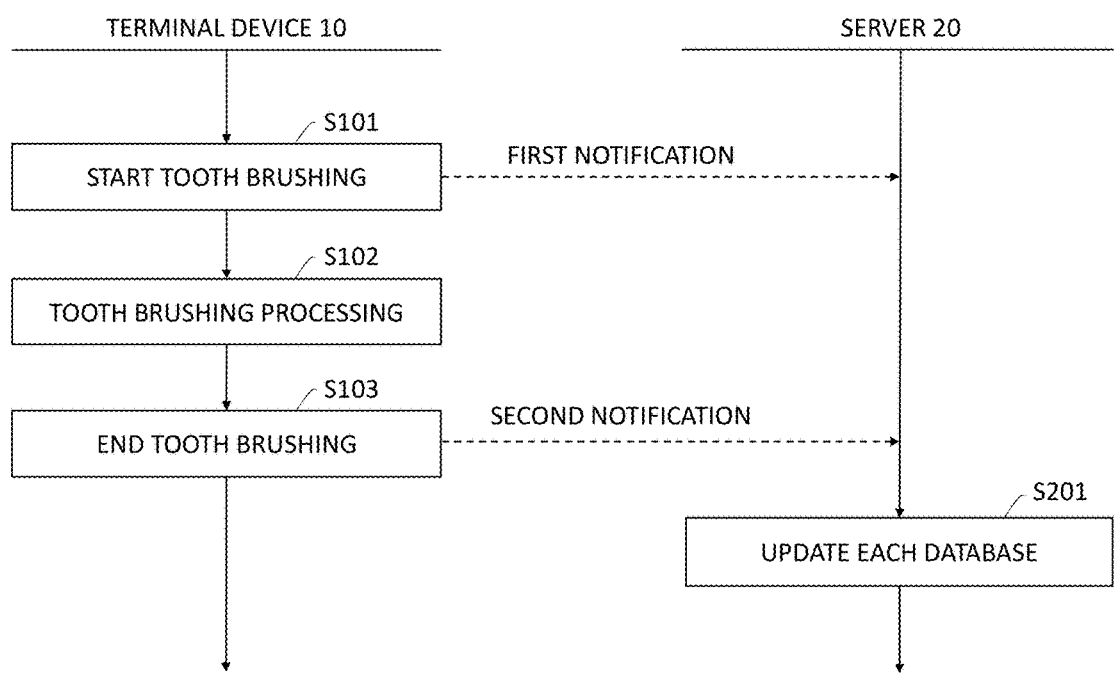
FIG. 6 is a diagram for explaining the operation of the terminal device and the server when a toothbrush game is played.

The operation of the terminal device 10 and the server 20 when the toothbrush game is played will be described. FIG. 6 is a diagram for explaining the operation of the terminal device 10 and the server 20 when the toothbrush game is played.

The user of the terminal device 10 selects a toothbrush game application from a group of applications displayed on the display 132 of the terminal device 10.

The terminal device 10 receives an input from the user through the input operation reception unit 191. When the toothbrush game application is selected by the user, the notification control unit 195 of the terminal device 10 causes the display 132 to display a start screen of the toothbrush game.

In addition, when the alarm function installed in the operating system (OS) detects that the notification time set in the toothbrush game has been reached, the notification control unit 195 causes the display 132 to display the start screen of the toothbrush game.

The user presses a start button on the start screen displayed on the display 132.

When the user presses the start button displayed on the display 132, the game control unit 193 of the terminal device 10 starts the toothbrush game (step S101). When the toothbrush game is started, the transmission and reception unit 192 of the terminal device 10 transmits a first notification indicating that the toothbrush game has started to the server 20. The first notification includes, for example, a play ID, a user ID, an execution date, and a start time.

(A) Tooth Brushing Processing

Figure 7:
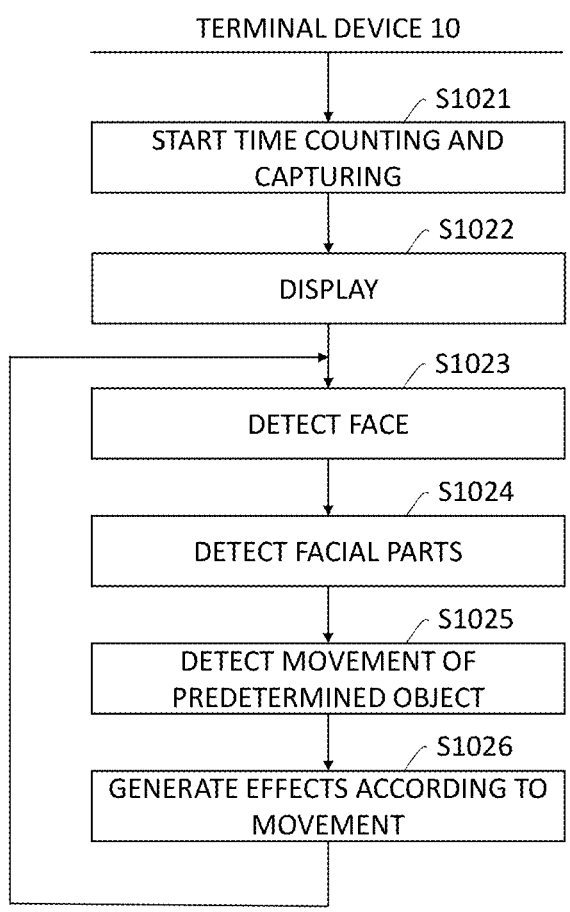
FIG. 7 is a flowchart illustrating an example of the operation of a control unit for tooth brushing processing illustrated in FIG. 6.

FIG. 7 is a flowchart illustrating an example of the operation of the control unit 190 for tooth brushing processing illustrated in FIG. 6. In FIG. 7, a case where the terminal device 10 is a smartphone will be described as an example.

When the toothbrush game is started by the game control unit 193, the imaging control unit 194 controls the camera 160 and starts capturing a moving image (step S1021).

The notification control unit 195 creates a captured image based on a captured signal acquired by the camera 160. The notification control unit 195 causes the display 132 to display the captured image and a game image (step S1022). When the game control unit 193 starts the toothbrush game, the game control unit 193 reads the play time from the user information 181 in the storage unit 180. The game control unit 193 starts counting for the read play time. The notification control unit 195 causes the display 132 to display the counting information.

Figure 8:
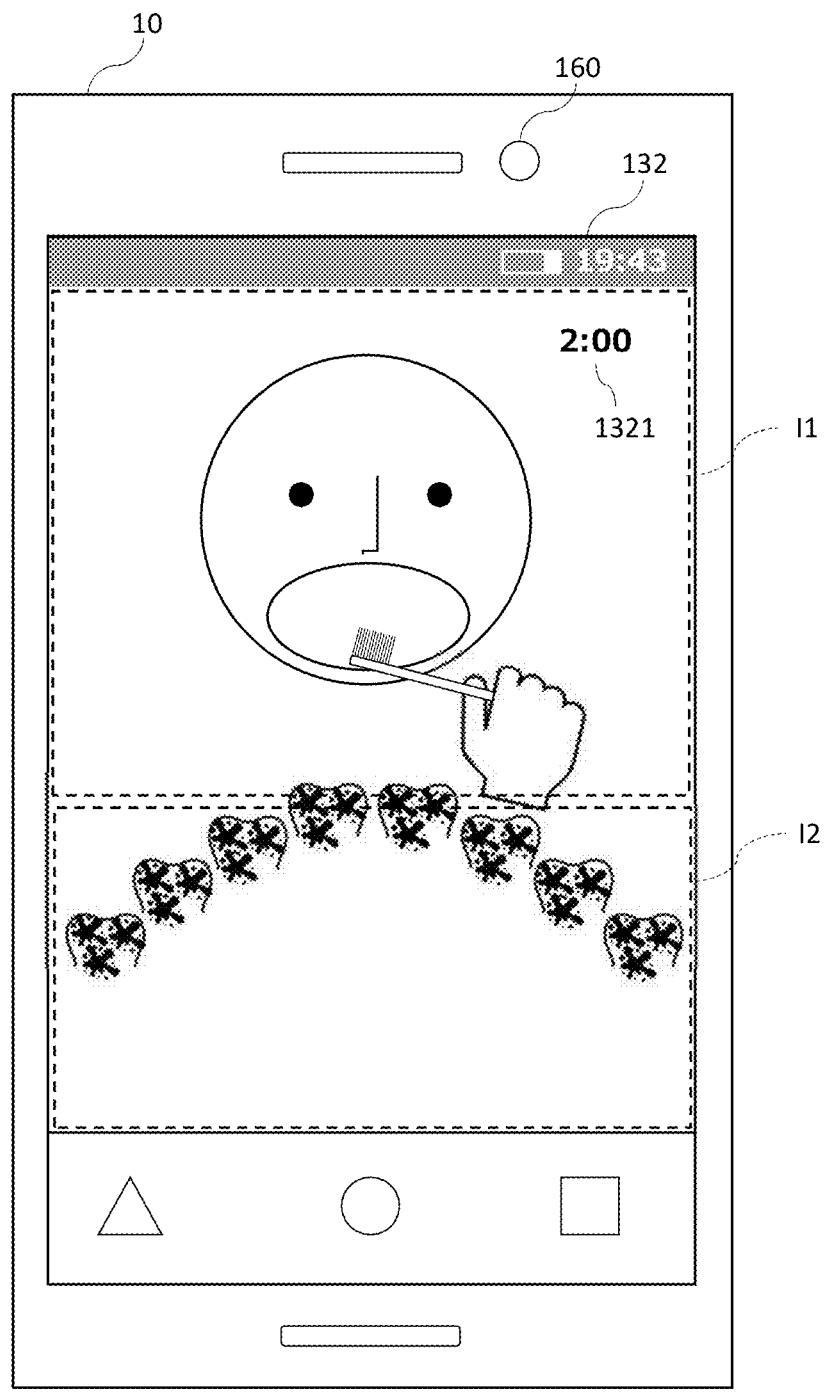
FIG. 8 is a schematic view illustrating a display example of a display.

FIG. 8 is a schematic view illustrating a display example of the display 132. In the example illustrated in FIG. 8, a captured image I1 and a game image I2 are displayed on the display 132. The captured image I1 is displayed in the upper area of the display 132, and the game image I2 is displayed in the lower area of the display 132.

The captured image I1 includes a scenery captured by the camera 160. In FIG. 8, a user brushing his/her teeth is displayed. The user refers to the captured image I1 and brushes his/her teeth while confirming that the user appears in the captured image I1. The terminal device 10 may be supported by the user or may be supported by a person other than the user. The terminal device 10 may be placed or fixed in a stable place.

In the game image I2, an image according to the toothbrush game appears. In FIG. 8, an image of imitation of the inside of the mouth is displayed on the terminal device 10. As illustrated in FIG. 8, on the terminal device 10, an image including a plurality of teeth illustrating the inside of the mouth from the inside is displayed. The image of FIG. 8 suggests to the user a place to brush teeth. FIG. 8 is an image immediately after the game is started, in which the displayed teeth are in a dirty state.

Information indicating the play time is displayed on the display 132. The information indicating the play time may be a display representing the remaining time or the elapsed time in a graph, or a display representing the remaining time or the elapsed time numerically. In the example illustrated in FIG. 8, a remaining time 1321 is superimposed and displayed on the captured image I1. FIG. 8 is an example of an image immediately after the game is started, in which "2:00" set as the play time is displayed.

The data processing unit 196 analyzes the captured image I1 displayed on the display 132 and detects a face area included in the captured image I1 (step S1023). In the present embodiment, the face area includes an area from the chin to the head. In the image analysis method by the data processing unit 196, for example, a known method is used. For example, the data processing unit 196 inputs the captured image I1 into a trained model trained to detect a face, and detects the face area included in the captured image I1.

When detecting the face area, the data processing unit 196 detects facial parts from the detected face area (step S1024). In the present embodiment, the facial parts are, for example, chin, mouth, nose, eyes, ears, and head. In the image analysis method by the data processing unit 196, for example, a known method is used. For example, the data processing unit 196 inputs the detected face area into a trained model trained to detect facial parts, and detects the face area included in the captured image I1. The trained model used in the data processing unit 196 may have been trained so that a face area and facial parts are output at the same time in response to an input of the captured image I1.

When detecting the facial parts, the data processing unit 196 detects that a predetermined object area is regularly moving in a predetermined area set based on the detected parts (step S1025). For example, the data processing unit 196 sets an area around the mouth based on the detected parts such as the chin, mouth, nose, and eyes. The data processing unit 196 calculates a difference between frames in the set area, and detects a regular motion of an object area with a predetermined size in the set area. The object area with the predetermined size represents, for example, a mass area representing a toothbrush and a hand holding the toothbrush. The regular motion refers to, for example, a repetitive motion at a predetermined speed in a preset direction.

Figure 9:
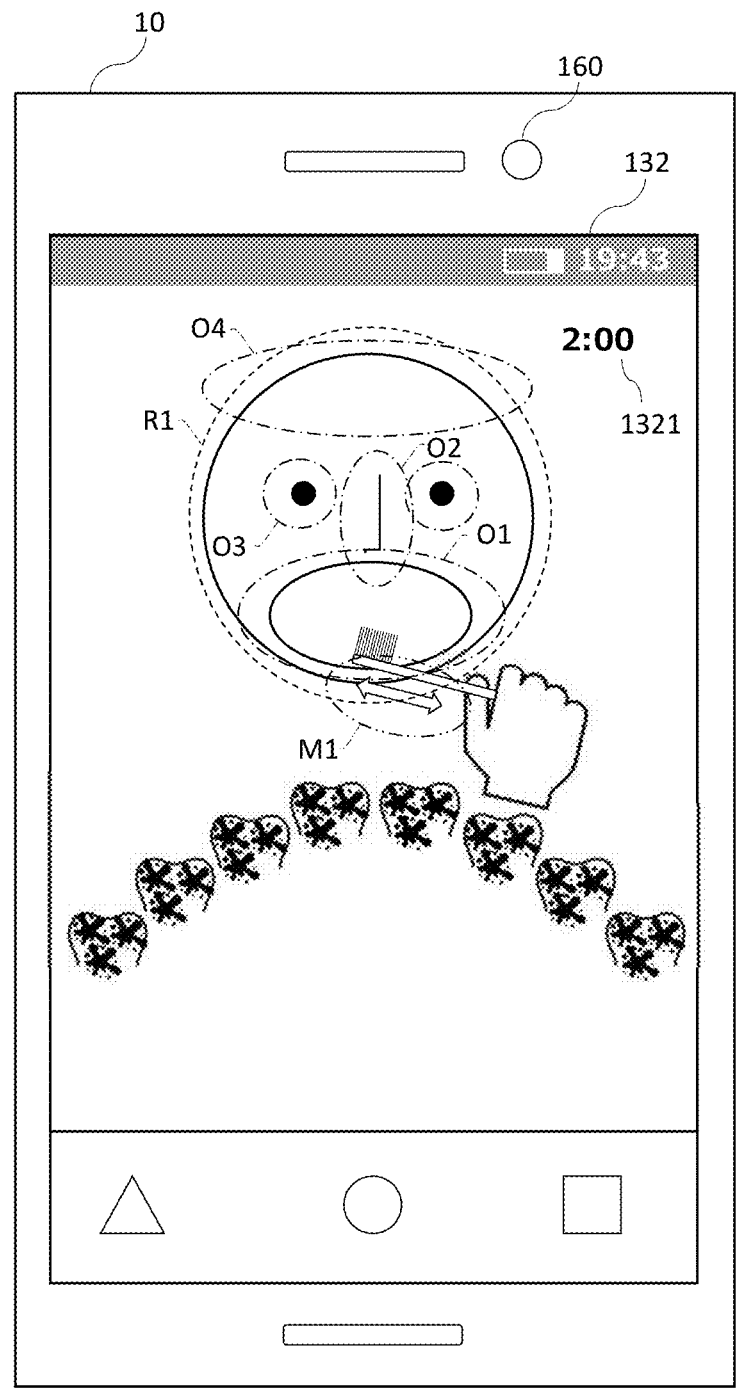
FIG. 9 is a schematic view illustrating an example of an object detected by image analysis in a data processing unit.

FIG. 9 is a schematic view illustrating an example of an object detected by image analysis in the data processing unit 196. In step S1023, the data processing unit 196 detects a face area R1 indicated by a broken line. In step S1024, the data processing unit 196 detects facial parts (mouth 01, nose 02, eyes 03, and head 04) indicated by an alternate long and short dash line. In step S1025, the data processing unit 196 detects a regular motion M1, indicated by an alternate long and short dash line, of an object area in an area around the mouth.

When the data processing unit 196 detects the regular motion of the object area, the game control unit 193 generates advantageous effects on the game according to the detected motion (step S1026). The game control unit 193 generates predetermined effects according to the detected regular motion, for example. The predetermined effects are, for example, special effects of superimposing an animation of advantageous effects due to tooth brushing, such as bubbles and brilliance on a dirty tooth from a toothbrush to show that stains on the tooth located at the destination of the animation are eliminated to make a white tooth.

Figure 10:
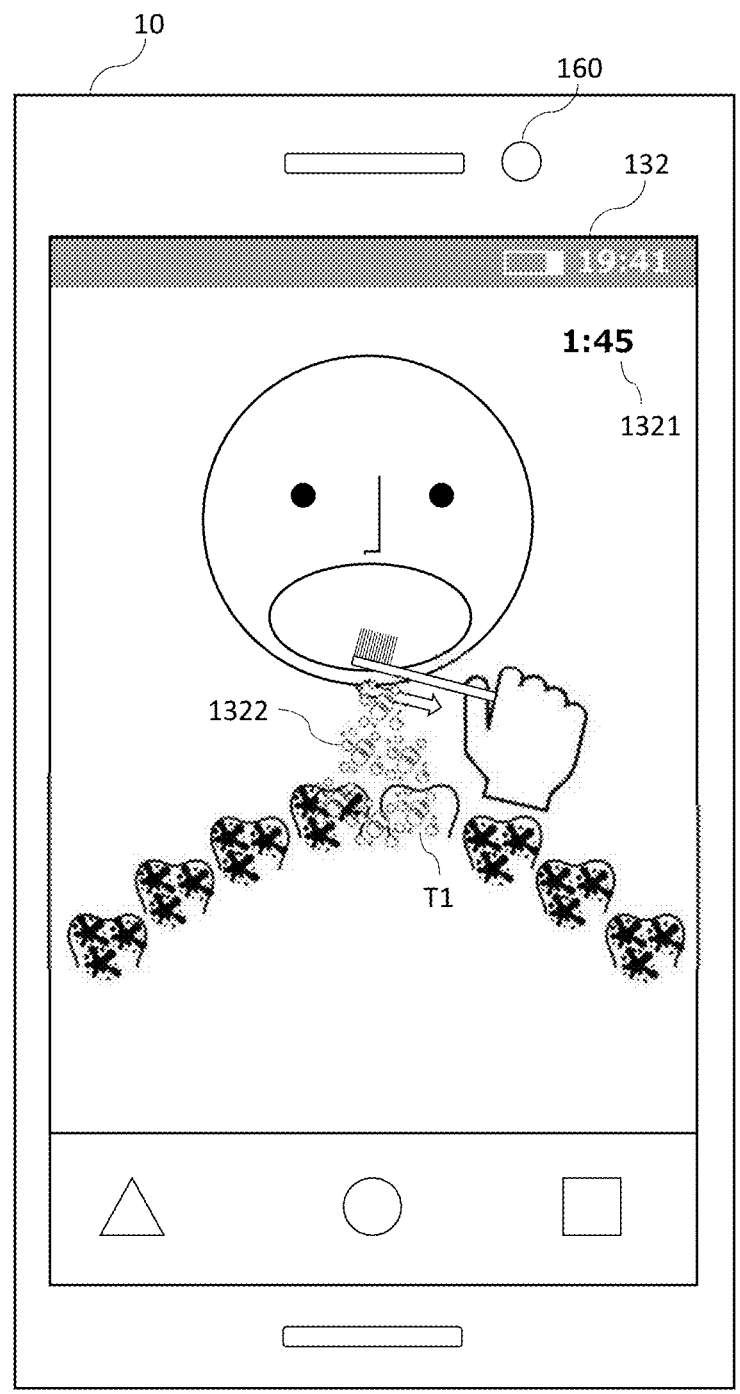
FIG. 10 is a schematic view illustrating an example of advantageous effects generated by a game control unit.

FIG. 10 is a schematic view illustrating an example of advantageous effects generated by the game control unit 193. According to the example illustrated in FIG. 10, bubbles are blown from the object area to a tooth T1, and stains on the tooth T1 that have been exposed to the blown bubbles are washed.

The user is attracted to the bubbles blown from the toothbrush and the whitening tooth, and accordingly keeps moving the hand holding the toothbrush. On the other hand, if the user stops brushing his/her teeth, bubbles will not be blown from the toothbrush. Thus, the user will feel a sense of crisis in the teeth with more stains, and will continue to move the hand holding the toothbrush. The data processing unit 196 detects the toothbrush and the hand holding the toothbrush, that is, the regular movement of the object area, in a plurality of frames. The game control unit 193 causes bubbles to be blown from the toothbrush to each tooth in frames in which the movement is detected, and cleans the dirty teeth one by one.

The game control unit 193 may produce effects for promoting continuous tooth brushing. For example, the game control unit 193 may make the whitened tooth dirty again when a plurality of consecutive frames in which the regular motion of the object area does not appear are detected.

The game control unit 193 causes a boss character to appear in the game image 12 when the tooth brushing reaches a predetermined condition. The predetermined condition is, for example, that the game progress has achieved a predetermined situation such as a situation where stains of a preset number of teeth of the teeth appearing in the game image 12 have been removed, that the remaining play time has reached a specific time of day, or a combination thereof. The boss character is, for example, one that looks like a boss of caries bacteria.

The appearance of the boss character is based on the appearance of any one of a plurality of game characters. The game control unit 193 randomly selects any one of the plurality of game characters as a boss character, for example. When the game control unit 193 causes a boss character to appear in the game image 12, for example, the game control unit 193 applies stains to the corresponding game character so as not to show its entirety. For example, the game control unit 193 masks the corresponding game character with one color and causes a boss character to appear in such a manner that only the silhouette can be visually recognized. For example, the game control unit 193 causes a boss character to appear in such a manner that only a part of the corresponding game character can be visually recognized.

The game control unit 193 may select any one of the plurality of game characters as the boss character based on how well the teeth are brushed. For example, when the teeth are brushed well, the game control unit 193 selects a game character with rareness (strength) depending on that skill. The game control unit 193 certifies the skill of brushing teeth based on, for example, the number of consecutive frames in which the regular motion of the object area is detected. The game control unit 193 may certify the skill of brushing teeth, taking into consideration whether the regular motion is detected in a plurality of places of the area around the mouth or at a position suitable for tooth brushing in the area around the mouth.

When the data processing unit 196 detects the regular motion of the object area, the game control unit 193 generates advantageous effects on the game according to the detected motion. For example, the game control unit 193 superimposes an animation of tooth brushing effects such as bubbles and brilliance on the boss character from the toothbrush according to the detected regular motion, and removes stains on the boss character located at the destination of the animation.

The user is attracted to the bubbles blown from the toothbrush and the boss character on which the stains have been removed, and accordingly keeps moving the hand holding the toothbrush. On the other hand, if the user stops brushing his/her teeth, bubbles will not be blown from the toothbrush. Thus, the user will feel a sense of crisis in the boss character with more stains, and will continue to move the hand holding the toothbrush. The data processing unit 196 detects the hand holding the toothbrush, that is, the regular movement of the object area, in a plurality of frames. The game control unit 193 causes bubbles to be blown from the toothbrush to the boss character in frames in which the movement is detected, and removes stains from the boss character.

The game control unit 193 may cause a small character(s) to appear in addition to the boss character. The small character is, for example, one that looks like a caries bacterium. When the data processing unit 196 detects the regular motion of the object area, the game control unit 193 generates advantageous effects on the game according to the detected motion. For example, the game control unit 193 superimposes an animation of tooth brushing effects such as bubbles and brilliance on the small character(s) from the toothbrush according to the detected regular motion, and causes the small character(s) located at the destination of the animation to disappear.

Figure 11:
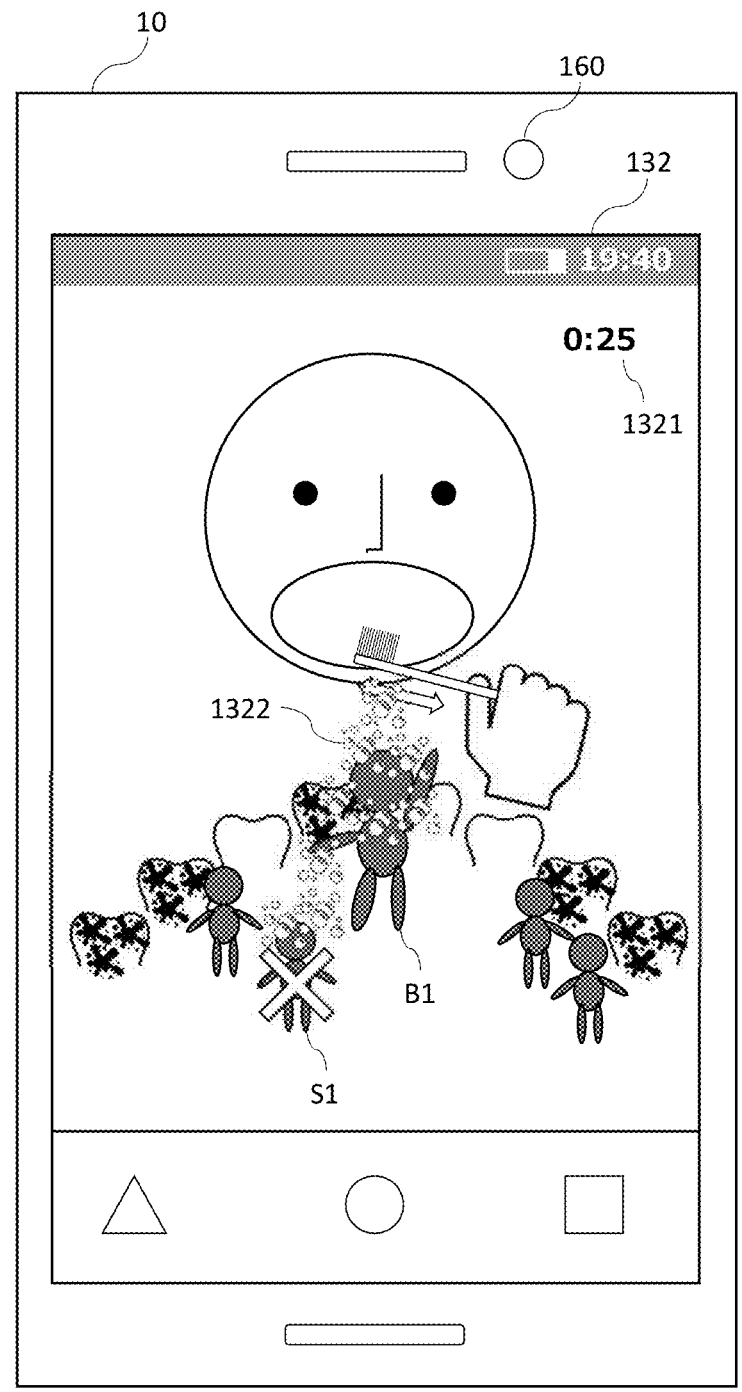
FIG. 11 is a schematic view illustrating an example of advantageous effects generated by the game control unit.

FIG. 11 is a schematic view illustrating an example of advantageous effects generated by the game control unit 193. According to the example illustrated in FIG. 11, bubbles are blown from the object area to a boss character B1 and a small character S1. The stains on the boss character B1 that gets hit by the bubbles are removed. In addition, the small character S1 that gets hit by the bubbles disappears.

The game control unit 193 may produce effects for promoting continuous tooth brushing. For example, the game control unit 193 may make the boss character from which the stains have been removed dirty again when a plurality of consecutive frames in which any motion of the object area does not appear are detected. For example, the game control unit 193 may increase the number of small characters when a plurality of consecutive frames in which any motion of the object area does not appear are detected.

When the set play time is reached, the game control unit 193 ends one play of the toothbrush game. According to the example illustrated in FIG. 11, when the remaining time 1321 becomes "0:00", the game control unit 193 ends one play of the toothbrush game. When one play of the toothbrush game is ended, the game control unit 193 displays a screen for catching the boss character. On the screen for catching the boss character, text is displayed such that the currently displayed screen can be recognized as the catch screen.

Figure 12:
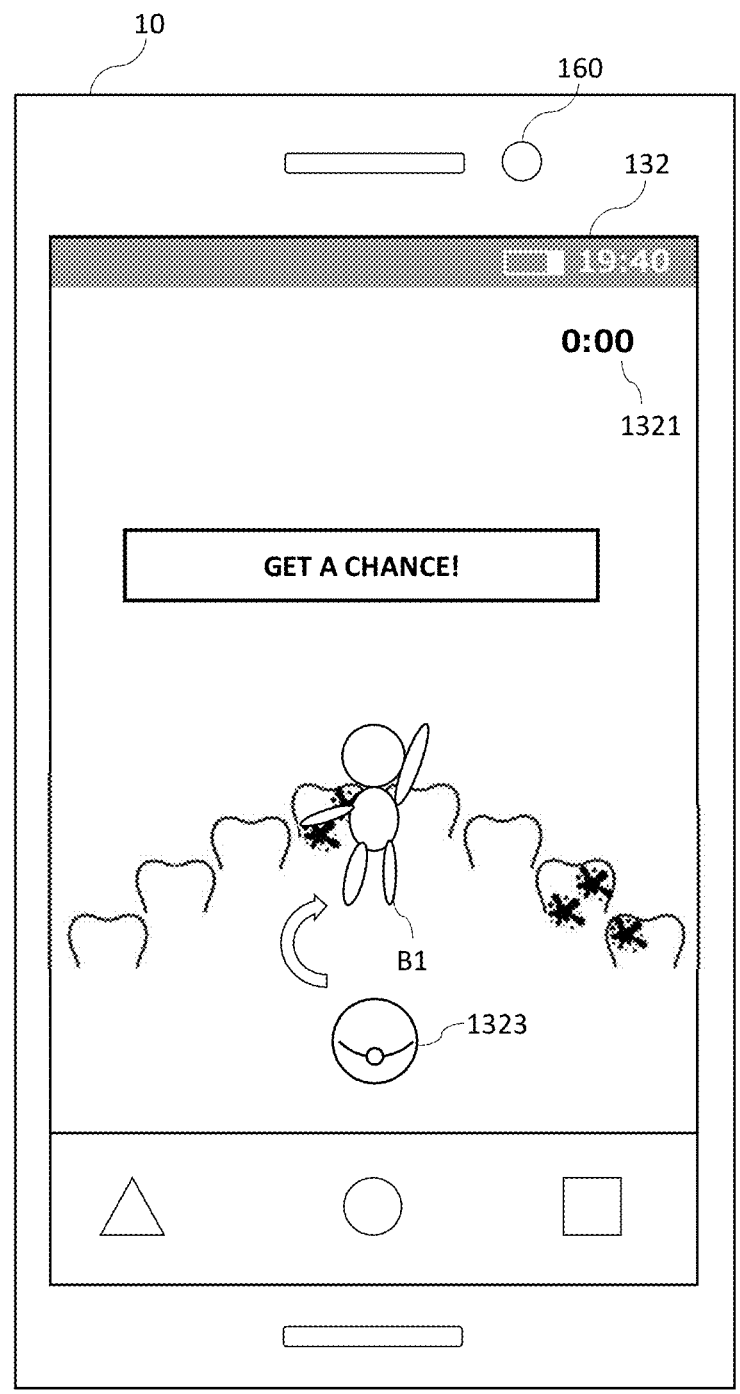
FIG. 12 is a schematic view illustrating an example of a screen for catching a boss character.

FIG. 12 is a schematic view illustrating an example of a screen for catching a boss character. According to the example illustrated in FIG. 12, the text "Get a chance!" indicating a capture screen is superimposed on the captured image I1. In the game image 12, the boss character B1 and a catch tool 1323 for catching the boss character B1 appear.

The user throws the catch tool 1323 to the boss character B1 by, for example, flicking the catch tool 1323. The user attempts to catch the boss character B1 by throwing the catch tool 1323 to the boss character B1.

When the catch tool 1323 comes into contact with the boss character B1, the game control unit 193 determines whether or not the boss character B1 is caught successfully. At this time, the game control unit 193 sets the probability that the boss character B1 is caught successfully based on the skill of brushing teeth. For example, the game control unit 193 may determine whether or not the user has brushed his/her teeth well based on whether or not the user has cleared a game task presented to the user regarding the operation of brushing teeth. For example, the game task may be that a plurality of teeth is brushed evenly, that the toothbrush is moved repeatedly within a certain period of time, that the number of times the toothbrush is moved reaches a certain number of times, and the like. The game control unit 193 improves the catch probability of the boss character B1 when the user brushes his/her teeth well. On the other hand, for example, the game control unit 193 lowers the catch probability of the boss character B1 when the user does not brush his/her teeth well. More specifically, the game control unit 193 sets the probability that the boss character B1 is caught successfully based on the degree of stain removal of the boss character B1. For example, the game control unit 193 improves the catch probability of the boss character B1 when all stains on the boss character B1 have been removed. On the other hand, for example, the game control unit 193 lowers the catch probability of the boss character B1 when some stains on the boss character B1 are not removed. In other words, the game control unit 193 sets the probability that a privilege can be acquired according to the result of detecting the regular motion of the object area.

When the boss character is caught, the game control unit 193 registers the caught character in the user information 181. The characters registered in the user information 181 can be displayed on the display 132 as a list.

When the boss character is caught, the game control unit 193 gives the user a sticker designed based on the caught character. When the sticker is given, the game control unit 193 registers the given sticker as a held item in the user information 181.

The game control unit 193 determines whether or not to give a headgear when the catch of the boss character is completed regardless of whether or not the catch is successful. The game control unit 193 randomly determines, for example, whether or not to give the user a headgear. The game control unit 193 may determine whether or not to give a headgear based on the skill of brushing teeth. When a headgear is given, the game control unit 193 registers the given headgear in the user information 181 as a held item. The game control unit 193 may give a headgear when displaying the start screen.

When the game control unit 193 gives a headgear or determines to give no headgear, the game control unit 193 ends the toothbrush game. When ending the toothbrush game, the game control unit 193 reads a comment from the comment information 182. The notification control unit 195 notifies the read comment. For example, the notification control unit 195 causes the display 132 to display the read comment.

When ending the toothbrush game, the game control unit 193 may calculate the evaluation of the completed tooth brushing. The game control unit 193 evaluates the tooth brushing based on, for example, the status of the motion of the object area detected by the data processing unit 196, the status of cleaning the boss character, the number of times the tooth brushing is praised, and the like. The game control unit 193 may read a comment from the comment information 182 based on the evaluation of tooth brushing.

(B) Play Time Stop Processing

Although the operation of the control unit 190 in the toothbrush game has been described, the operation of the control unit 190 is not limited to the above description.

For example, in the toothbrush game according to the present embodiment, the play time is temporarily stopped. For example, if the data processing unit 196 fails to detect the user's face area in step S1023, the game control unit 193 stops the counting of the play time. The case where the data processing unit 196 fails to detect the user's face area is, for example, the case where the user is not displayed on the display 132, or the case where the user is not facing the front on the display 132.

When the data processing unit 196 fails to detect the user's face area in step S1023, the notification control unit 195 makes a notification to encourage the user to show the face area.

Figure 13:
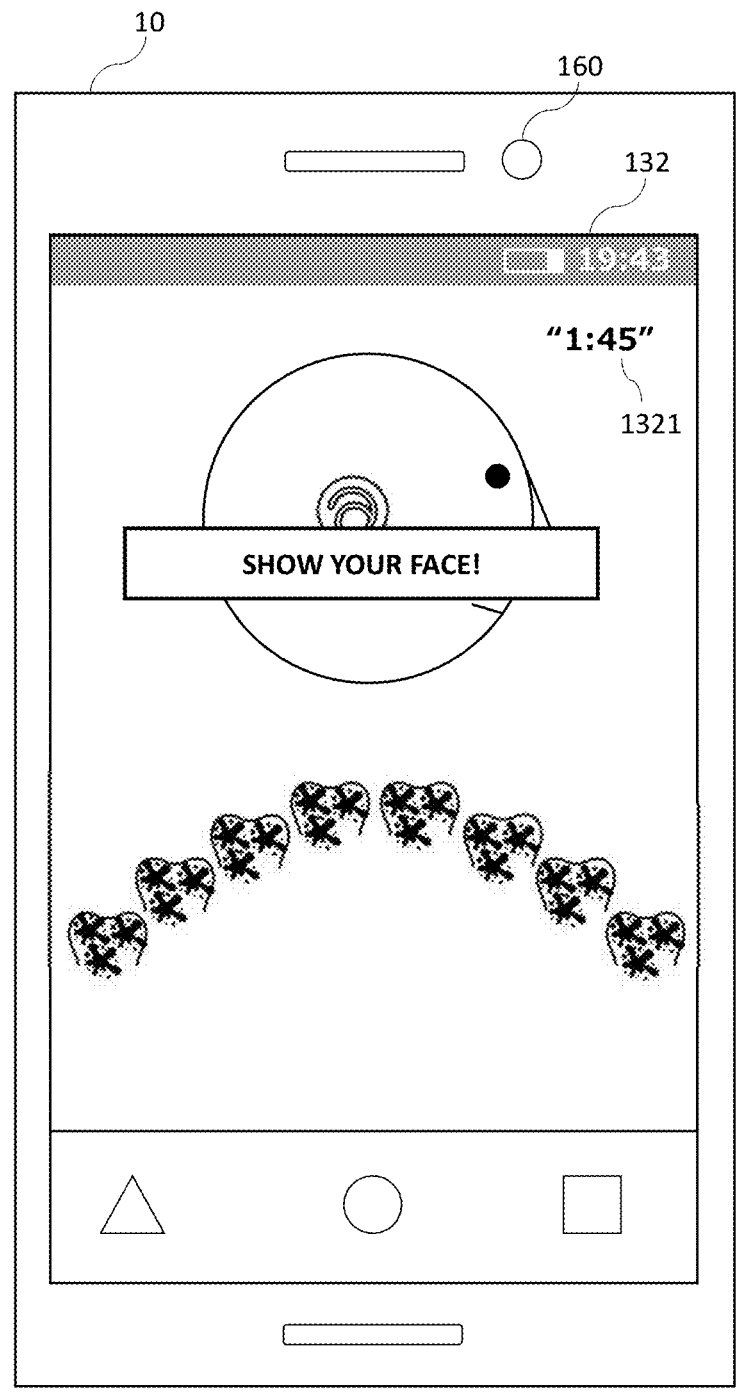
FIG. 13 is a schematic view illustrating a display example of the display in which a user's face area cannot be detected.

FIG. 13 is a schematic view illustrating a display example of the display 132 in which a user's face area cannot be detected. In the example illustrated in FIG. 13, the user is facing sideways. Since the user is facing sideways, the data processing unit 196 fails to detect the user's face area. When the user's face area is not detected by the data processing unit 196, the game control unit 193 stops the counting of the play time. When the counting of the play time is stopped, the notification control unit 195 holds the remaining time 1321 as it was stopped. According to the example illustrated in FIG. 13, the notification control unit 195 holds the remaining time 1321 at "1:45". In addition, the notification control unit 195 causes the display 132 to display text to encourage the user to show his/her face. According to the example illustrated in FIG. 13, the notification control unit 195 causes the text "Show your face!" to appear in the captured image I1. The notification to encourage the user to show the face area may be a voice notification.

(C) Tooth Brushing Improvement Display

In the toothbrush game according to the present embodiment, for example, a notification to encourage the improvement of tooth brushing is made. For example, when the data processing unit 196 fails to detect the motion of the object area in step S1025, or when the detected motion does not satisfy a predetermined condition, the notification control unit 195 makes a notification to encourage the improvement of tooth brushing.

Specifically, for example, when the user's hand stops, the object area including the toothbrush and the hand does not move. Accordingly, in step S1025, any motion of the object area is note detected by the data processing unit 196. When any motion of the object area is detected by the data processing unit 196, the notification control unit 195 causes the display 132 to display text to encourage tooth brushing, for example, "Brush your teeth!".

Figure 14:
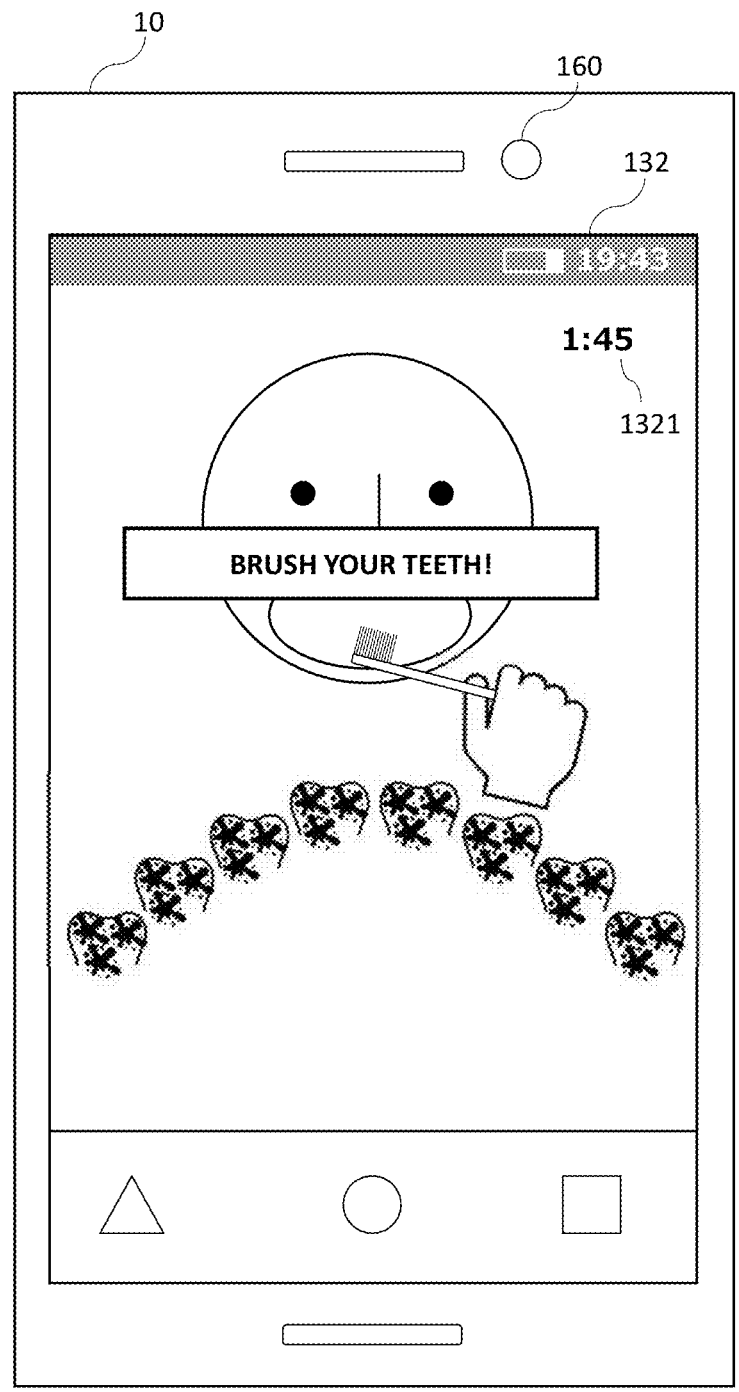
FIG. 14 is a schematic view illustrating a display example of the display on which text to encourage tooth brushing is displayed.

FIG. 14 is a schematic view illustrating a display example of the display 132 in which text to encourage tooth brushing is displayed. In the example illustrated in FIG. 14, the text "Brush your teeth!" appears in the captured image I1. At this time, predetermined effects expressing tooth brushing do not appear. For example, effects such as blown bubbles and brilliance from the toothbrush, and whitening teeth do not appear.

For example, for a small movement of the user's hand, the amount of movement of the object area is also small. For this case, the data processing unit 196 detects the motion of the object area in step S1025, but determines that the amount of this motion has not reached a preset amount of motion. When the amount of motion of the object area detected by the data processing unit 196 does not reach the preset value, the notification control unit 195 causes the display 132 to display text to encourage the improvement of tooth brushing, for example, "Brush your teeth more widely!".

For example, for a slow movement of the user's hand, or for a failure in regular repetitive movement, the data processing unit 196 detects the motion of the object area in step S1025, but determines that the speed of this motion has not reached a preset speed. When the speed of motion of the object area detected by the data processing unit 196 does not reach the preset speed, the notification control unit 195 causes the display 132 to display text to encourage the improvement of tooth brushing, for example, "Move your hand more!".

For example, for too fast movement of the user's hand, the data processing unit 196 detects the motion of the object area in step S1025, but determines that the speed of this motion exceeds the preset speed. When the speed of motion of the object area detected by the data processing unit 196 exceeds the preset speed, the notification control unit 195 causes the display 132 to display text to encourage the improvement of tooth brushing, for example, "Brush your teeth a little more slowly!".

The notification to encourage the improvement of tooth brushing may be a voice notification.

(D) Tooth Brushing Praise Display

In the toothbrush game according to the present embodiment, for example, a notification to praise tooth brushing is made. For example, when the motion of the object area detected by the data processing unit 196 in step S1025 satisfies a predetermined condition, the notification control unit 195 makes a notification to praise the tooth brushing.

Specifically, for example, in step S1025, the data processing unit 196 continuously detects the regular motion of the object area for a preset number of frames (for a certain period of time). When the data processing unit 196 continuously detects the regular motion of the object area for the preset number of frames, the notification control unit 195 causes the display 132 to display text to praise the tooth brushing, for example, "Well brushed!".

Figure 15:
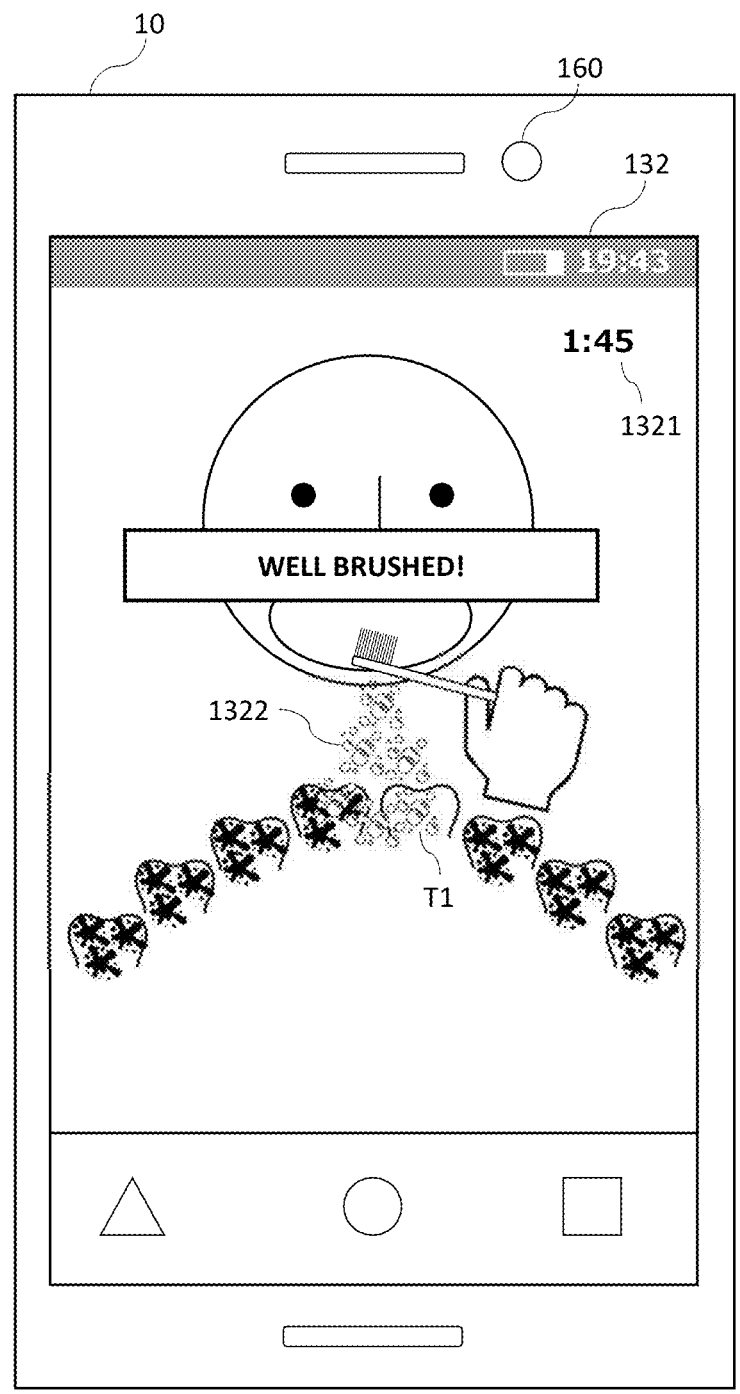
FIG. 15 is a schematic view illustrating a display example of the display on which text to praise tooth brushing is displayed.

FIG. 15 is a schematic view illustrating a display example of the display 132 in which text to praise tooth brushing is displayed. In the example illustrated in FIG. 15, the text "Well brushed!" appears in the captured image I1. The notification to praise tooth brushing may be a voice notification.

(E) Toothbrush Replacement Display

In the toothbrush game according to the present embodiment, for example, a notification to encourage the replacement of the toothbrush is given. For example, the game control unit 193 reads the date registered in the item "replacement date" from the user information 181 before the start of playing the toothbrush game. The phrase "before the start of playing the toothbrush game" refers to, for example, a point between the time when the toothbrush game application is selected by the user and the time when the start screen is displayed, or a point between the time when the start screen is displayed and the time when the start button is pressed.

The game control unit 193 determines whether or not a predetermined number of days have elapsed in a period of time from the read date to the current date. When the days have elapsed, the notification control unit 195 makes a notification to encourage the replacement of the toothbrush. The predetermined number of days is the number of days for which it is recommended to replace the toothbrush, for example, one month. Specifically, when the predetermined number of days have elapsed in a period of time from the read date to the current date, the notification control unit 195 causes the display 132 to display text to encourage the replacement of the toothbrush.

Figure 16:
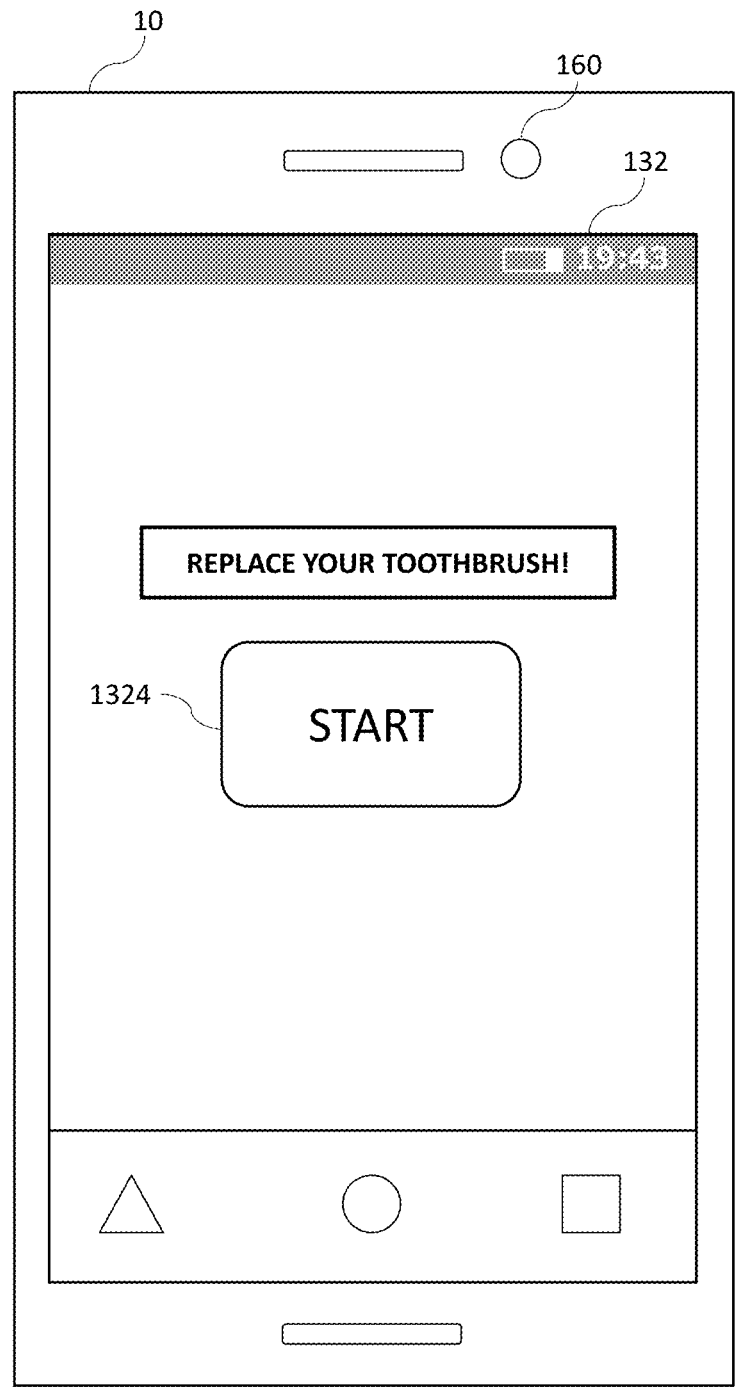
FIG. 16 is a schematic view illustrating a display example of the display on which text to encourage the replacement of the toothbrush is displayed.

FIG. 16 is a schematic view illustrating a display example of the display 132 on which text to encourage the replacement of the toothbrush is displayed. In the example illustrated in FIG. 16, text to encourage the replacement of the toothbrush is displayed above a start button 1324, for example, "Replace your toothbrush!". The notification to encourage the replacement of the toothbrush may be a voice notification.

Subsequently, the update of the date registered in the item "replacement date" in the user information 181 will be described. When the start button 1324 is pressed after the user replaces the toothbrush, the processing illustrated in FIG. 6 is executed. The terminal device 10 executes the tooth brushing processing illustrated in FIG. 7 in step S102.

Figure 17:
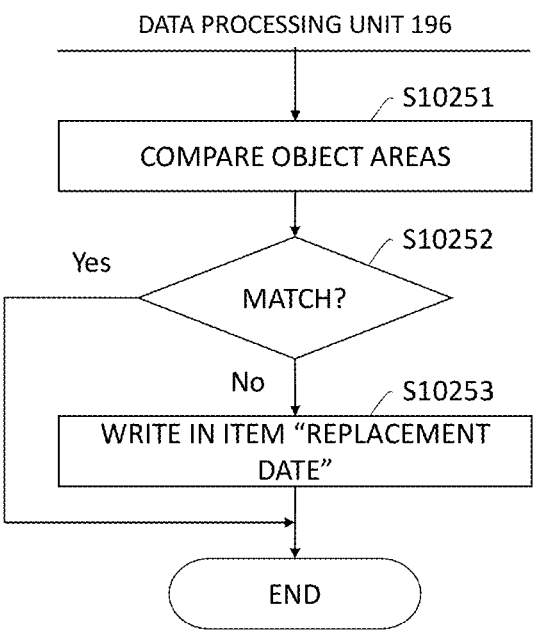
FIG. 17 is a flowchart illustrating an example of the operation of the data processing unit to update the item "replacement date".

FIG. 17 is a flowchart illustrating an example of the operation of the data processing unit 196 to update the item "replacement date". FIG. 17 shows a flowchart of the operation in which the data processing unit 196 updates the item "replacement date" in step S1025 illustrated in FIG. 7. In the description of FIG. 17, it is assumed that the data processing unit 196 stores information on the object area, the regular motion of which is detected, in the storage unit 180 during the previous play of the toothbrush game. The information on the object area is information for identifying the toothbrush included in the object area, and is, for example, pixel information of the object area.

When detecting the motion of the object area in step S1025 of FIG. 7, the data processing unit 196 compares the object area in which the motion is detected with the object area stored during the previous play of the toothbrush game (step S10251). The data processing unit 196 determines whether or not the current object area matches the previous object area based on the color, shape, and the like of a rod part in the object area (step S10252). If they match (Yes in step S10252), the data processing unit 196 ends the processing. If they do not match (No in step S10252), the data processing unit 196 writes the current date in the item "replacement date" in the user information 181 (step S10253).

For the case where it is detected that the toothbrush has been replaced based on the captured image of the user without a user input of whether or not the user has replaced the toothbrush, the terminal device 10 may give the user a reward for the game being played after the toothbrush that has been used for a certain period of time is replaced (that is, after the toothbrush is replaced on a day when the toothbrush is to be replaced). For example, when the terminal device 10 identifies by image recognition whether or not the user's toothbrush is favored in the toothbrush game, the terminal device 10 may notify the user of "the toothbrush has been replaced" during that toothbrush game or at the end of that toothbrush game, and give a game object or the like or allow the user to play a specific game unit. For example, when the toothbrush that has been used for a certain period of time is replaced, the user may be notified that the user is allowed to play a special game unit. This may make the user feel more enjoyable in brushing teeth after the toothbrush is replaced at the time suitable for replacing it, so that it is possible to help the user establish a habit of brushing teeth.

(F) Use of Game Items

In the toothbrush game according to the present embodiment, for example, the user can use the held game items in the toothbrush game.

For example, a held headgear can be displayed according to a user operation so as to cover his/her head included in the captured image during the play of the toothbrush game.

Specifically, for example, the notification control unit 195 displays an icon to allow for the use of an item on the start screen of the toothbrush game. When the icon is pressed by the user, the notification control unit 195 displays a list of held headgears on the display 132.

The user selects a desired headgear from among the headgears displayed on the display 132.

When the headgear is selected by the user, the notification control unit 195 displays the start screen of the toothbrush game on the display 132. When the start button is pressed by the user, the terminal device 10 executes the processing illustrated in FIG. 6. In step S102 of FIG. 6, the control unit 190 executes the tooth brushing processing illustrated in FIG. 7.

When the head is detected in step S1024 of FIG. 7, the notification control unit 195 superimposes and displays an image of the headgear selected by the user on the detected head. Even if the user displayed on the display 132 moves, the notification control unit 195 follows the user's head and superimposes the headgear on the user's head.

Figure 18:
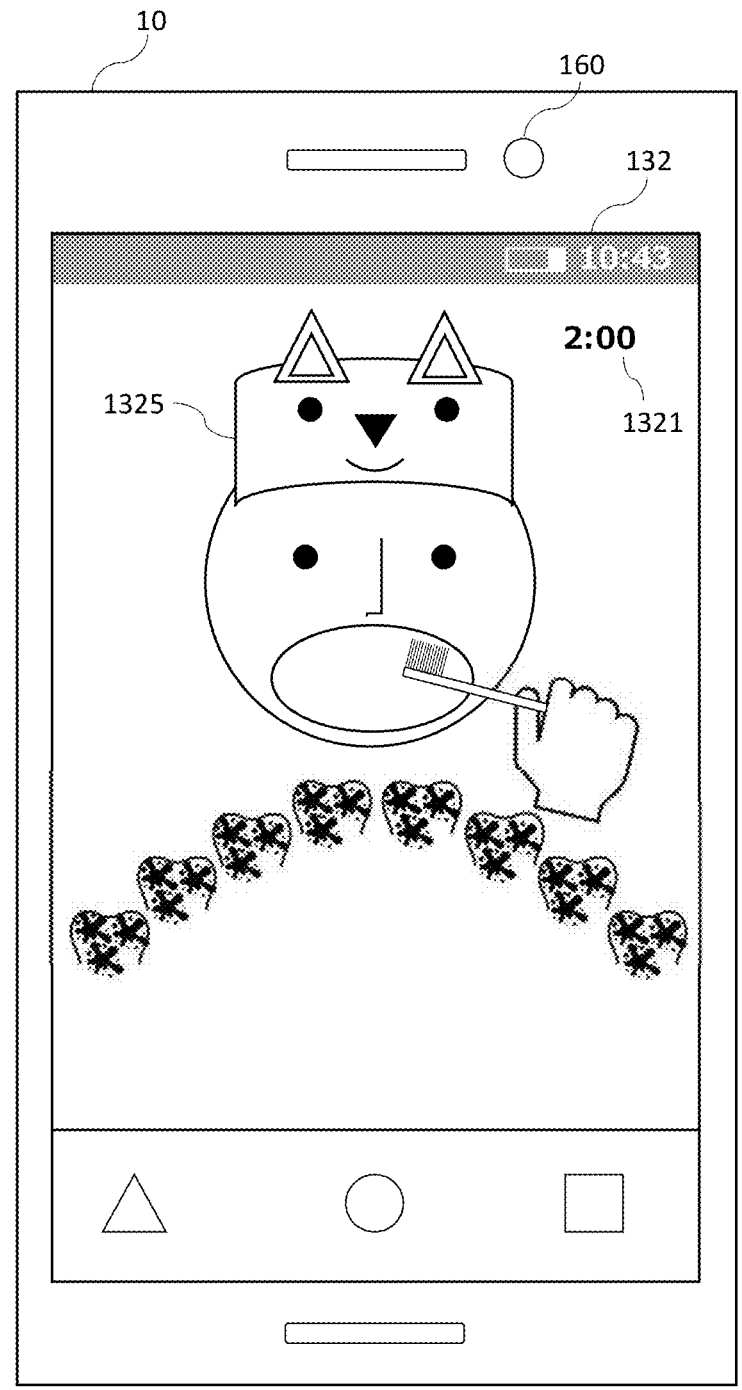
FIG. 18 is a schematic view illustrating an example of a screen on which a user who wears a headgear is displayed.

FIG. 18 is a schematic view illustrating an example of a screen on which a user who wears a headgear is displayed.

According to the example illustrated in FIG. 18, the user is wearing a headgear 1325 designed with the face of a character.

The facial expression of that headgear changes depending on the tooth brushing skill of the user. For example, when the motion of the object area detected by the data processing unit 196 in step S1025 of FIG. 7 satisfies a predetermined condition, the notification control unit 195 changes the facial expression of the headgear.

Specifically, for example, in step S1025, the data processing unit 196 continuously detects the regular motion of the object area for a preset number of frames. When the data processing unit 196 continuously detects the regular motion of the object area for the preset number of frames, the notification control unit 195 changes the facial expression of the headgear to a smile face. When the data processing unit 196 continuously detects the regular motion of the object area for the preset number of frames, the notification control unit 195 changes the facial expression of the headgear to a sad face.

For example, the user can attach a held sticker to a still image. The still image includes a still image captured by a user operation or a still image automatically captured in the play of the toothbrush game. An operation of attaching a sticker to a still image automatically captured in the play of the toothbrush game will now be described.

For example, when the game control unit 193 determines that a predetermined event flag is active, the game control unit 193 stores the still image in the storage unit 180. The predetermined event flag becomes active when a predetermined condition is satisfied, for example, when the data processing unit 196 first detects the regular motion of the object area, when a boss character appears, when a notification to praise tooth brushing is made, when a notification to encourage the improvement of tooth brushing, or when tooth brushing effects appear on the boss character. The tooth brushing effects appearing on the boss character include, for example, that all stains on the boss character have been removed.

More specifically, for example, when the event flag is active and a predetermined second elapses, the game control unit 193 stores the frame at that time in the storage unit 180 as a still image. The notification control unit 195 may cause the display 132 to display a capturing timing so that the user can recognize that capturing timing of the still image. The game control unit 193 stores a game image at that time in the storage unit 180 as well as the still image. The game image may include, for example, a predetermined notification (for example, a notification to praise the tooth brushing, such as "Well brushed!").

When the catch of the boss character is completed regardless of whether or not the catch is successful, the game control unit 193 creates a plurality of capture images based on a plurality of still images stored during play and a plurality of game images corresponding to the respective still images. A screenshot as used in the present embodiment refers to a captured (saved) image of a screen displayed on the display 132 during the play of the toothbrush game. The notification control unit 195 causes the display 132 to display the created screenshots.

The user selects at least one screenshot to be displayed on the display 132. The user superimposes a held sticker on the selected screenshot at any position. The user causes the storage unit 180 to store the screenshot with the sticker attached. At this time, the game control unit 193 deletes the still images and the game images not selected by the user from the storage unit 180.

Referring back to FIG. 6, the description follows. When the tooth brushing processing of step S102 is ended, the transmission and reception unit 192 of the terminal device 10 transmits a second notification indicating that the toothbrush game is ended to the server 20. The second notification includes a play ID and a user ID. The terminal device 10 transmits, for example, the updated information in the user information 181 to the server 20 together with the second notification. For example, the terminal device 10 transmits information on the items "replacement date", "held items", and "caught characters" to the server 20 as the updated information in the user information 181.

In addition, the terminal device 10 transmits information on the tooth brushing to the server 20. The information on the tooth brushing includes any information such as the status of the motion of the object area detected by the data processing unit 196, the status of cleaning the boss character, the number of times the tooth brushing is praised, the evaluation of the tooth brushing calculated by the game control unit 193, and the like.

When the first management module 2044 of the server 20 receives the second notification, the first management module 2044 updates the user information database 281. Specifically, when receiving the second notification, the first management module 2044 updates the information stored in the user information database 281 by using the updated information in the user information 181.

When the second management module 2045 of the server 20 receives the second notification, the second management module 2045 updates the log information database 282. Specifically, when receiving the second notification, the second management module 2045 adds a new log for the finished play to the log information database 282.

The information stored in the user information database 281 and the log information database 282 is used for various analysis. For example, it is possible to analyze a day when the toothbrush is to be replaced, based on the item "replacement date" in the user information database 281. Further, it is possible to analyze the distribution of play time by age based on the items "age" and "play time" in the user information database 281. In addition, it is possible to cause a limited character to appear and analyze the effect of a campaign based on the distribution of the limited character held.

As described above, in the above-described embodiment, the game control unit 193 of the terminal device 10 starts counting the time for defining one play of the toothbrush game in response to the start of the toothbrush game. The imaging control unit 194 controls the camera 160 to capture an image of the user. The data processing unit 196 detects the user's face area from the captured image, detects facial parts from the detected face area, and sets an area around the mouth. The data processing unit 196 detects the movement of an object including the toothbrush and the hand in the area around the mouth. The game control unit 193 controls the toothbrush game based on the detected movement of the object. The game control unit 193 stops the counting of the time when the area around the mouth is not set but not stopping the counting of the time when the movement of the object is not detected. This makes it possible to stop the counting of the time by the user being out of the screen, for example, for a reason to temporarily stop brushing the teeth. In other words, it is possible to stop the counting of the time during the toothbrush game, for example, when the toothbrush is passed to the parent to finish the tooth brushing, or when the toothbrush is taken out of the mouth to eject saliva. This makes it possible to prevent the tooth brushing from becoming incomplete due to being highly attracted to the progress of the toothbrush game.

Therefore, according to the toothbrush game according to the present embodiment, it is possible not to inhibit the user from brushing his/her teeth while maintaining the attractiveness.

Further, in the above-described embodiment, the data processing unit 196 detects a face area from a captured image of the user, detects facial parts different from the user's mouth from the detected face area, and sets an area around the mouth. The condition that "the area around the mouth is not set" means that the face area is not detected. As a result, the user can stop the counting of the play time by turning away from the camera 160.

In the above-described embodiment, the game control unit 193 restarts the counting of the time when a face area is detected in the state where the face area has not been detected. As a result, even if the tooth brushing cannot be continued due to temporary circumstances, the toothbrush game can be restarted as soon as the circumstances are resolved. This eliminates the need to ask the parent to finish the tooth brushing or to put up with taking the toothbrush out of the mouth to eject saliva.

In the above-described embodiment, when the data processing unit 196 fails to detect the face area, the notification control unit 195 makes a notification to encourage the user to show his/her face. This makes it possible for the user to easily recognize that the toothbrush game does not proceed because his/her face is not captured correctly.

In the above-described embodiment, when the data processing unit 196 fails to detect the movement of an object, or when the detected movement does not satisfy a predetermined condition, the notification control unit 195 makes a notification to encourage the user to improve his/her tooth brushing. This makes it possible for the user to understand how to move his/her hand to improve the tooth brushing.

In the above-described embodiment, the data processing unit 196 compares the past image of the object with the current image, and if the images do not match, the data processing unit 196 makes a notification to encourage the user to replace the toothbrush. This makes it possible to encourage the replacement of the toothbrush at an appropriate timing. In addition, the detection by image analysis makes it possible to encourage the replacement of the toothbrush regardless of the type of toothbrush.

In the above-described embodiment, the game control unit 193 changes the rate of granting a privilege based on the result of detecting the movement of the object. This makes it possible to enhance the attractiveness.

In the above-described embodiment, the game control unit 193 increases the rate of granting when the movement of the object is continuously detected, and reduces the rate of granting when the movement of the object is not continuously detected. This makes it possible to prevent poor tooth brushing.

In the above-described embodiment, the game control unit 193 launches the toothbrush game at a preset time. This makes it possible to establish tooth brushing as a life routine. In addition, it is possible to remind the user of tooth brushing.

In the above-described embodiment, the data processing unit 196 detects a head area as a facial part. The notification control unit 195 superimposes a headgear designed with the face of a game character on the head area, and changes the facial expression of the headgear based on the result of detecting the movement of the object. This makes it possible to grasp from the facial expression of the headgear that the tooth brushing is being done well. In addition, the user will do his/her best to brush his/her teeth in order to see a good facial expression or not to see a sad facial expression.

In the above-described embodiment, the game control unit 193 determines that one of the plurality of predetermined conditions in the toothbrush game is satisfied. The game control unit 193 displays a notification associated with the satisfied condition on the game screen. The game control unit 193 captures a game screen including the notification. The game control unit 193 displays at least one of the screenshots created by capturing the game screen when one play of the toothbrush game is ended. This makes it possible to collect images captured during the toothbrush game. In other words, the game experience is improved. In addition, the images acquired during the toothbrush game make it possible for the user's parents to confirm that the user was brushing his/her teeth earnestly.

Here, the terminal device 10 may be configured to execute the toothbrush game based on the game program in either a first mode or a second mode. For example, the first mode is a mode for a child to play the toothbrush game, and the second mode is a mode for his/her parent to refer to a record of the child brushing his/her teeth. In the second mode, the terminal device 10 may be configured to allow the user (child) to refer to logs (date, game play results (the item "evaluation", etc. in the log information database 282), and the like) of his/her play of the toothbrush game in chronological order. Such logs may be comparable to the tooth brushing logs of other users, and accordingly, the terminal device 10 may mask the information on the other users (or not mask information on other users who have a friendship with him/her) and display the tooth brushing logs of the other users to be compared with his/her tooth brushing logs. This can help a plurality of users try to establish a habit of brushing teeth.

The user may be allowed to register information on a region in which the user is brushing his/her teeth. When the user performs an operation of registering the region, for example, the user information database 281 of the server 20 holds the information on the user's region.

In the above-described embodiment, the event flag becomes active when the regular movement of the object is first detected, when a boss character appears, when a notification to praise tooth brushing is made, when a notification to encourage the improvement of tooth brushing, or when tooth brushing effects appear on the boss character. This makes it possible to acquire images in various cases.

In the above-described embodiment, the notification control unit 195 notifies the user of a comment about tooth brushing when one play of the toothbrush game is ended. This allows the user to obtain useful information about his/her tooth brushing.

In the above-described embodiment, the transmission and reception unit 192 transmits information on the toothbrush game to the server. This makes it possible to perform various analyses based on the information obtained in the toothbrush game.

In the above-described embodiment, the information on the toothbrush game includes the age of the user, the time limit for one play, the time for notifying the start of the toothbrush game, the toothbrush replacement date, the toothbrush game execution date, the start time of the toothbrush game, and the evaluation of the toothbrush game. This makes it possible to perform various analyzes based on the information obtained in the toothbrush game.

It is to be noted that the present embodiment is not limited to the above description.

For example, although in the above-described embodiment, a case has been described as an example in which the captured image I1 is displayed in the upper area of the display 132, and the game image I2 is displayed in the lower area of the display 132, the arrangement of the images is not limited to this. The captured image may be displayed in the lower area of the display 132 and the game image may be displayed in the upper area of the display 132.

Although in the above-described embodiment, a case has been described as an example in which a plurality of teeth appear in the game image, what appears in the game image is not limited to teeth.

In the above-described embodiment, a case has been described as an example in which the toothbrush is a general toothbrush having no additional function. However, the toothbrush may have a mechanism for identifying the toothbrush when encouraging the replacement of the toothbrush. For example, the toothbrush may be attached with an optical mark thereon. The optical mark is a mark in which identification information of the toothbrush or the like is encoded, for example, a barcode, a one-dimensional pixel code, or a two-dimensional pixel code. For example, when the toothbrush game is played and the optical mark is captured by the camera 160, the data processing unit 196 decodes the optical mark to acquire the identification information. When the storage unit 180 does not store information related to the identification information, the data processing unit 196 stores the acquired identification information in the storage unit 180.

When the identification information is already stored in the storage unit 180, the data processing unit 196 executes the same processing as the processing illustrated in FIG. 17. Specifically, the data processing unit 196 compares the acquired identification information with the identification information stored during the previous play of the toothbrush game. The data processing unit 196 determines whether or not the current identification information matches the previous identification information. If they match, the data processing unit 196 ends the processing. When they do not match, the data processing unit 196 writes the current date in the item "replacement date" in the user information 181.

The toothbrush may be attached with a small electronic tag thereon (for example, an IC tag, an RFID tag, or a wireless tag) that is driven by receiving radio waves. For example, the electronic tag stores the identification information of the toothbrush and the like. In this case, the terminal device 10 also functions as, for example, a tag reader. For example, when the toothbrush game is played, the data processing unit 196 acquires the identification information from the electronic tag by the tag reader function. When the storage unit 180 does not store information related to the identification information, the data processing unit 196 stores the acquired identification information in the storage unit 180. The optical mark or electronic tag is not used to detect the movement of the toothbrush.

In the above-described embodiment, a case has been described as an example in which the information on one user is stored in the user information 181 of the storage unit 180. However, as the information stored in the user information 181 of the storage unit 180, information on a plurality of users such as two or three people may be stored. When the information on the users is stored in the user information 181, for example, a selection screen for selecting a piece of user information is displayed on the start screen of the toothbrush game. After the user selects his/her own information on the selection screen, the user presses the start button on the start screen to start the game. This makes it possible to update the information on the user's past play to a new one.

It is to be noted that it is not always necessary to select the information on the user on the selection screen in order to execute the toothbrush game using his/her own information. For example, each piece of information in the user information 181 may store information on a face for identifying the user. The imaging control unit 194 controls the camera 160 to capture the user's face, for example, on the start screen. For example, on the start screen, the data processing unit 196 collates the face of the user captured by the camera 160 with the face stored in the user information 181. The game control unit 193 identifies information in which face information that matches the user's face is stored, and starts the toothbrush game using the identified information.

It is to be noted that what is stored as each piece of information in the user information 181 is not limited to the information on the face. Information on the toothbrush may be stored as each piece of information in the user information 181. The information on the toothbrush may be information determined by image analysis, for example, color or shape, may be identification information read from an optical mark, or may be identification information read from a wireless tag. The game control unit 193 identifies stored information about a toothbrush that matches the toothbrush held by the user from the user information 181, and starts the toothbrush game using the identified information.

Although in the above-described embodiment, a case has been described as an example in which the server 20 is included in the game system 1, the number of servers 20 included in the game system 1 is not limited to one. A plurality of servers 20 each including the communication IF 22, the input/output IF 23, the memory 25, the storage 26, and the processor 29 may be deployed so that each of the input operation reception unit 191, the transmission and reception unit 192, the game control unit 193, the imaging control unit 194, the notification control unit 195, and the data processing unit 196 can be implemented by any of the servers 20.

Although some embodiments of the present disclosure have been described above, these embodiments can be implemented in various other forms, and modifications can be made without departing from the scope and spirit of the invention. It is to be understood that such embodiments and modifications thereof are included in the scope and spirit of the invention and are also included in the invention as set forth in the claims as well as equivalents thereof.

SUPPLEMENTS

The matters described in the respective embodiments will be supplemented hereinafter.

Supplement 1

A game program for being executed by a computer including a processor 19 and a memory 15, the game program causing the processor to execute steps of:
  starting counting a time that defines one play of a toothbrush game in response to starting the toothbrush game (step S1021);
  capturing an image of a user (step S1021);
  setting an area around a mouth by detecting a face area of the user from the captured image and detecting a facial part from the detected face area (step S1023, step S1024);

detecting movement of an object including a toothbrush and a hand in the area around the mouth (step S1025);
controlling the toothbrush game based on the detected movement of the object (step S1026); and
stopping the counting of the time when the area around the mouth is not set but not stopping the counting when the movement of the object is not detected.

Supplement 2

The game program according to (Supplement 1), wherein the step of setting the area around the mouth includes detecting the face area from the captured image and detecting a facial part different from the mouth of the user from the detected face area to set the area around the mouth, and in the step of stopping the counting of the time, the area around the mouth being not set means that the face area is not detected.

Supplement 3

The game program according to (Supplement 1) or (Supplement 2), causing, when the face area is detected in a state where the face area has not been detected, the processor to execute a step of restarting the counting of the time.

Supplement 4

The game program according to any one of (Supplement 1) to (Supplement 3), wherein the step of setting the area around the mouth includes making a notification to encourage the user to show a face when the face area fails to be detected.

Supplement 5

The game program according to any one of (Supplement 1) to (Supplement 4), wherein the step of detecting the movement of the object includes making a notification to encourage the user to improve tooth brushing when the movement of the object fails to be detected or when the detected movement does not satisfy a predetermined condition.

Supplement 6

The game program according to any one of (Supplement 1) to (Supplement 5), causing the processor to execute steps of:
comparing a past image of the object with a current image; and
making a notification to encourage the user to replace the toothbrush when the images do not match.

Supplement 7

The game program according to any one of (Supplement 1) to (Supplement 6), wherein the step of controlling the toothbrush game includes changing a rate of granting a privilege based on a result of detecting the movement of the object.

Supplement 8

The game program according to (Supplement 7), wherein the step of controlling the toothbrush game includes increasing the rate of granting when the movement of the object is continuously detected, and reducing the rate of granting when the movement of the object is not continuously detected.

Supplement 9

The game program according to any one of (Supplement 1) to (Supplement 8), causing the processor to execute a step of launching the toothbrush game at a preset time.

Supplement 10

The game program according to (Supplement 2), causing the processor to execute steps of:
superimposing, when a head area is detected as a facial part, a headgear designed with a face of a game character on the head area; and changing facial expression of the headgear based on a result of detecting the movement of the object.

Supplement 11

The game program according to any one of (Supplement 1) to (Supplement 10), causing the processor to execute steps of:
determining whether one of a plurality of predetermined conditions for the toothbrush game is satisfied;
displaying a notification associated with the satisfied condition on a game screen;
capturing a game screen with the notification; and
displaying at least one of screenshots created by capturing the game screen when one play of the toothbrush game is ended.

Supplement 12

The game program according to any one of (Supplement 1) to (Supplement 11), causing the processor to execute steps of:
determining whether one play of the toothbrush game is ended;
making an evaluation of tooth brushing for one-play; and
notifying the user of a comment about the tooth brushing set based on the evaluation.

Supplement 13

The game program according to any one of (Supplement 1) to (Supplement 12), causing the processor to execute a step of transmitting information on the toothbrush game to a server.

Supplement 14

The game program according to (Supplement 13), wherein the information on the toothbrush game includes an age of the user, a time limit for one play, a time for notifying start of the toothbrush game, a toothbrush replacement date, a toothbrush game execution date, a start time of the toothbrush game, and an evaluation of the toothbrush game.

Supplement 15

A method executed by a computer including a processor and a memory, the method executing, by the processor reading a game program stored in the memory to execute the game program, steps of:

starting counting a time that defines one play of a toothbrush game in response to starting the toothbrush game;
capturing an image of a user;
setting an area around a mouth by detecting a face area of the user from the captured image and detecting a facial part from the detected face area;
detecting movement of an object including a toothbrush and a hand in the area around the mouth;
controlling the toothbrush game based on the detected movement of the object; and
stopping the counting of the time when the area around the mouth is not set but not stopping the counting when the movement of the object is not detected.

Supplement 16

An information processing device including a control unit and a storage unit, the information processing device being configured to execute, by the control unit operating based on a game program stored in the storage unit, steps of:
starting counting a time that defines one play of a toothbrush game in response to starting the toothbrush game;
capturing an image of a user;
setting an area around a mouth by detecting a face area of the user from the captured image and detecting a facial part from the detected face area;
detecting movement of an object including a toothbrush and a hand in the area around the mouth;
controlling the toothbrush game based on the detected movement of the object; and
stopping the counting of the time when the area around the mouth is not set but not stopping the counting when the movement of the object is not detected.

Supplement 17

A system including a plurality of information processing devices,
the system being configured to execute, by any one of the information processing devices operating based on a game program, steps of:
starting counting a time that defines one play of a toothbrush game in response to starting the toothbrush game;
capturing an image of a user;
setting an area around a mouth by detecting a face area of the user from the captured image and detecting a facial part from the detected face area;
detecting movement of an object including a toothbrush and a hand in the area around the mouth;
controlling the toothbrush game based on the detected movement of the object; and
stopping the counting of the time when the area around the mouth is not set but not stopping the counting when the movement of the object is not detected.

REFERENCE SIGNS LIST

1 Game system
10, 10A, 10B Terminal device
111, 112 Antenna
121 First wireless communication unit
122 Second wireless communication unit
13 Input device
130 Operation reception unit
131 Touch sensitive device
132 Display
1321 Remaining time
1323 Catch tool
1324 Start button
1325 Headgear
14 Output device
140 Voice processing unit
141 Microphone
142 Speaker
15 Memory
150 Location information sensor
16 Storage unit
160 Camera
170 Motion sensor
180 Storage unit
181 User information
182 Comment information
19 Processor
190 Control unit
191 Input operation reception unit
192 Transmission and reception unit
193 Game control unit
194 Imaging control unit
195 Notification control unit
196 Data processing unit
20 Server
201 Communication unit
202 Storage unit
203 Control unit
2041 Operation content acquisition module
2042 Reception control module
2043 Transmission control module
2044 First management module
2045 Second management module
25 Memory
26 Storage
281 User information database
282 Log information database
29 Processor
80 Network
80 Radio base station

The invention claimed is:

1. A non-transitory computer-readable medium storing computer-readable instructions thereon which, when executed by a computer, cause the computer to perform a method, the method comprising:
starting counting a time that defines one play of a toothbrush game in response to starting the toothbrush game;
capturing an image of a user;
setting an area around a mouth by detecting a face area of the user from the captured image and detecting a facial part from the detected face area;
detecting movement of an object including a toothbrush and a hand in the area around the mouth;
controlling the toothbrush game based on the detected movement of the object; and
stopping the counting of the time in response to the area around the mouth not being set and not stopping the counting in response to the movement of the object not being detected,
wherein controlling the toothbrush game includes changing a rate of granting an in-game advantage based on a result of detecting the movement of the object.

2. The non-transitory computer-readable medium according to claim 1, wherein setting the area around the mouth includes
 detecting the face area from the captured image and detecting a facial part different from the mouth of the user from the detected face area to set the area around the mouth, and
 wherein the area around the mouth being not set corresponds to the face area not being detected.

3. The non-transitory computer-readable medium according to claim 1, further comprising:
 in response to a state where the face area has not been detected, restarting the counting of the time.

4. The non-transitory computer-readable medium according to claim 1, wherein setting the area around the mouth includes displaying a notification to encourage the user to show a face in response to failing to detect the face area.

5. The non-transitory computer-readable medium according to claim 1, wherein detecting the movement of the object includes displaying a notification to encourage the user to improve tooth brushing in response to failing to detect the movement of the object or in response to the detected movement not satisfying a predetermined condition.

6. The non-transitory computer-readable medium according to claim 1, further comprising:
 comparing a past image of the object with a current image; and
 displaying a notification to encourage the user to replace the toothbrush in response to the images not matching.

7. The non-transitory computer-readable medium according to claim 1, wherein controlling the toothbrush game includes increasing the rate of granting in response to the movement of the object being continuously detected, and reducing the rate of granting in response to the movement of the object not being continuously detected.

8. The non-transitory computer-readable medium according to claim 1, further comprising launching the toothbrush game at a preset time.

9. The non-transitory computer-readable medium according to claim 2, further comprising:
 superimposing, in response to a head area being detected as a facial part, a headgear designed with a face of a game character on the head area; and
 changing facial expression of the headgear based on a result of detecting the movement of the object.

10. The non-transitory computer-readable medium according to claim 1, further comprising:
 determining whether one of a plurality of predetermined conditions for the toothbrush game is satisfied;
 displaying a notification associated with the satisfied condition on a game screen;
 capturing a game screen with the notification; and
 displaying at least one screenshot created by capturing the game screen in response to one play of the toothbrush game ending.

11. The non-transitory computer-readable medium according to claim 1, further comprising:
 determining whether one play of the toothbrush game has ended;
 making an evaluation of tooth brushing for one play; and
 notifying the user of a comment about the tooth brushing based on the evaluation.

12. The non-transitory computer-readable medium according to claim 1, further comprising:
 transmitting information on the toothbrush game to a server.

13. The non-transitory computer-readable medium according to claim 12, wherein the information on the toothbrush game includes an age of the user, a time limit for one play, a time for notifying start of the toothbrush game, a toothbrush replacement date, a toothbrush game execution date, a start time of the toothbrush game, and an evaluation of the toothbrush game.

14. A method, comprising:
 starting counting a time that defines one play of a toothbrush game in response to starting the toothbrush game;
 capturing an image of a user;
 setting an area around a mouth by detecting a face area of the user from the captured image and detecting a facial part from the detected face area;
 detecting movement of an object including a toothbrush and a hand in the area around the mouth;
 controlling the toothbrush game based on the detected movement of the object; and
 stopping the counting of the time in response to the area around the mouth not being set and not stopping the counting in response to the movement of the object not being detected,
 wherein controlling the toothbrush game includes changing a rate of granting an in-game advantage based on a result of detecting the movement of the object.

15. An information processing device, comprising:
 processing circuitry, wherein the processing circuitry is configured to
 start counting a time that defines one play of a toothbrush game in response to starting the toothbrush game;
 capture an image of a user;
 set an area around a mouth, wherein the processing circuitry for setting the area around the mouth is further configured to detect a face area of the user from the captured image and detect a facial part from the detected face area;
 detect movement of an object including a toothbrush and a hand in the area around the mouth;
 control the toothbrush game based on the detected movement of the object;
 stop the counting of the time in response to the area around the mouth not being set and not stopping the counting in response to the movement of the object not being detected; and
 change a rate of granting an in-game advantage based on a result of detecting the movement of the object.

16. A system comprising a plurality of information processing devices, wherein each of the plurality of information processing device includes processing circuitry, the processing circuitry being configured to:
 start counting a time that defines one play of a toothbrush game in response to starting the toothbrush game;
 capture an image of a user;
 set an area around a mouth, wherein the processing circuitry for setting the area around the mouth is further configured to detect a face area of the user from the captured image and detect a facial part from the detected face area;
 detect movement of an object including a toothbrush and a hand in the area around the mouth;
 control the toothbrush game based on the detected movement of the object;
 stop the counting of the time in response to the area around the mouth not being set and not stopping the counting in response to the movement of the object not being detected; and change a rate of granting an in-game advantage based on a result of detecting the movement of the object.

\* \* \* \* \*